(12) United States Patent
Takasaki et al.

(10) Patent No.: US 6,415,605 B1
(45) Date of Patent: Jul. 9, 2002

(54) BRAKE SYSTEM

(75) Inventors: Yoshiyasu Takasaki; Hidefumi Inoue; Hiroyuki Oka, all of Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/474,983

(22) Filed: Dec. 29, 1999

(30) Foreign Application Priority Data

| Jan. 14, 1999 | (JP) | ............................................ 11-007413 |
| Jan. 14, 1999 | (JP) | ............................................ 11-007414 |
| Jan. 14, 1999 | (JP) | ............................................ 11-007415 |

(51) Int. Cl.$^7$ .......................... B60T 13/12; B60T 13/20
(52) U.S. Cl. ........................................... 60/548; 60/549
(58) Field of Search ............................... 60/547.1, 548, 60/549, 552, 574, 582

(56) References Cited

U.S. PATENT DOCUMENTS

| 3,298,177 | A | * | 1/1967 | Kellogg ....................... 60/548 |
| 3,815,364 | A | * | 6/1974 | Belart et al. ................. 60/552 |
| 3,827,242 | A | * | 8/1974 | Belart ......................... 60/552 |
| 4,007,593 | A | * | 2/1977 | Baker .......................... 60/548 |
| 4,024,713 | A | * | 5/1977 | Ueda .......................... 60/547.1 |
| 4,198,823 | A | * | 4/1980 | Mathues et al. ........... 60/547.1 |
| 4,199,940 | A | * | 4/1980 | Mathues et al. ........... 60/547.1 |
| 4,359,869 | A | * | 11/1982 | Ideta .......................... 60/547.3 |
| 4,433,543 | A | * | 2/1984 | Thomas et al. ............. 60/547.1 |
| 4,435,960 | A | * | 3/1984 | Farr ............................ 60/547.1 |
| 4,458,490 | A | * | 7/1984 | Newhouse .................. 60/547.1 |
| 4,548,037 | A | * | 10/1985 | Farr .............................. 60/552 |
| 4,767,165 | A | * | 8/1988 | Burgdorf .................. 60/545 X |
| 4,850,655 | A | * | 7/1989 | Takata et al. .......... 60/547.1 X |

* cited by examiner

Primary Examiner—John E. Ryznic
(74) Attorney, Agent, or Firm—Flynn, Thiel, Boutell & Tanis, P.C.

(57) ABSTRACT

A brake system including an intensifying arrangement which allows a master cylinder pressure to be intensified by feeding a discharge pressure from a pump to an intensifying chamber. The brake system includes a master cylinder having a primary piston, on the rear portion of which a sleeve is fitted, with a spool valve slidably fitted into the sleeve. The spool valve has a rear end which abuts against the bottom of a bottomed opening formed in an input shaft. The invention allows a misalignment between the axes of the primary piston and the input shaft.

58 Claims, 11 Drawing Sheets

BRAKE SYSTEM

FIELD OF THE INVENTION

The present invention relates to a brake system, and more particularly, to a brake system which allows an increased braking effort to be obtained by a direct intensification of a master cylinder pressure.

DESCRIPTION OF THE PRIOR ART

In a conventional practice, a brake system for automobiles is provided with a brake booster which boosts an input to an output of a given magnitude through a negative pressure or a hydraulic pressure such as a liquid pressure. The output having an increased magnitude from the booster actuates a master cylinder to generate a master cylinder pressure in an attempt to achieve a braking effort of an increased magnitude with a reduced force of depression applied to a brake pedal.

A brake system provided with a negative pressure booster conventionally utilizes a negative pressure which is generated in an engine. However, with a recent trend toward a reduced fuel cost of an engine, the magnitude of a negative pressure that is generated by the engine tends to be lower, with a consequent reduction in the output from the negative pressure booster. To accommodate for such a reduction in the output, it may be contemplated to increase the size of the negative pressure booster. However, it is impractical to install a negative pressure booster of an increased size in an engine room.

On the other hand, a brake system which is provided with a liquid pressure booster requires the provision of components such as a pump, an accumulator and the like, disadvantageously resulting in an increased overall cost of the system.

It is desirable for a brake system in the event of a quick brake operation to generate a braking effort of an increased magnitude as quickly as possible and more rapidly than for a normal gentle braking operation.

Generating a braking effort of a greater magnitude is another requirement of a quick brake operation. For a beginner driver who is not experienced with driving an automobile, a failure of depressing a brake pedal through an increased stroke may result in a failure to generate a braking effort of a greater magnitude. In these circumstances, it is desirable that an assistance be provided to allow even such a driver to be able to generate a braking effort of a greater magnitude in a reliable manner.

However, such a demand cannot be met with a conventional brake system having a substantially fixed servo ratio for servo control of a braking operation, which prevents a braking effort of a greater magnitude from being generated in a quick brake operation more rapidly than in a normal brake operation, thus precluding the chance of affording any assistance to an unexperienced driver for reliably generating a braking effort of a greater magnitude.

A brake system provided with a conventional booster exhibits a braking effort which remains constant for an equal pedal stroke. However, if the braking effort remains constant for an equal pedal stroke, a flexible accommodation such as improving the brake maneuverability as by improving the operating feeling is precluded.

In view of the forgoing, it is an object of the invention to provide a brake system having a simple construction which enables a braking effort of a greater magnitude to be generated as required through an intensification of a master cylinder pressure while assuring a smooth operation.

It is another object of the invention to provide a brake system which allows the brake effectiveness to be enhanced at the commencement of the intensification.

It is a further object of the invention to provide a brake system which allows a pedal stroke to be reduced during the time the intensification is activated.

SUMMARY OF THE INVENTION

According to a first aspect of the invention, there is provided a brake system including a reservoir of braking liquid, a master cylinder defined in a housing to develop a master cylinder pressure therein as an associated master cylinder piston advances through the master cylinder, and a wheel cylinder which is fed with the master cylinder pressure, and comprising intensifying means for causing the master cylinder piston to advance as required to intensify the master cylinder pressure, the intensifying means comprising an intensifying chamber defined rearward of the master cylinder piston within the housing, a source of pressure connected to the intensifying chamber, an input shaft having a front portion disposed close to the intensifying chamber and mechanically coupled to a brake operating member to cause the master cylinder piston to advance, and a control valve mechanism disposed between the front end of the input shaft and the rear end of the master cylinder piston for switching a communication between the intensifying chamber and the reservoir, the control valve mechanism comprising a bottomed guide opening formed in at least one of the rear end of the master cylinder piston and the front end face of the input shaft, and a spool valve slidably fitted into the guide opening and having one end which abuts against at least one of the rear end of the master cylinder piston and the front end of the input shaft, whereby a radial misalignment between the axes of the master cylinder piston and the input shaft is tolerated.

According to a second aspect of the invention, there is provided a brake system including a reservoir of braking liquid, a master cylinder defined in a housing to develop a master cylinder pressure therein as an associated master cylinder piston advances through the master cylinder and a wheel cylinder which is fed with the master cylinder pressure, and comprising intensifying means for causing the master cylinder piston to advance as required to intensify the master cylinder pressure, the intensifying means comprising an intensifying chamber defined rearward of the master cylinder piston within the housing, a source of pressure connected to the intensifying chamber, an input shaft having a front portion disposed close to the intensifying chamber and mechanically coupled to a brake operating member to cause the master cylinder piston to advance, and a control valve mechanism disposed between the front end of the input shaft and the rear end of the master cylinder piston for switching a communication between the intensifying chamber and the reservoir, the control valve mechanism being movable relative to the master cylinder piston, further comprising stroke reducing means for controlling the relative positions of the control valve mechanism and the master cylinder piston such that the stroke of the input shaft is reduced as compared with the stroke of the master cylinder piston.

According to a third aspect of the invention, there is provided a brake system including a reservoir of braking liquid, a master cylinder defined in a housing to develop a master cylinder pressure therein as an associated master cylinder piston advances through the master cylinder, and a wheel cylinder which is fed with the master cylinder pressure, and comprising intensifying means for causing the master cylinder piston to advance as required to intensify the master cylinder pressure, the intensifying means comprising an intensifying chamber defined rearward of the master cylinder piston within the housing, a source of pressure connected to the intensifying chamber, an input shaft having a front portion disposed close to the intensifying chamber and mechanically coupled to a brake operating member to cause the master cylinder piston to advance, and a control valve mechanism disposed between the front end of the input shaft and the rear end of the master cylinder piston for switching a communication between the intensifying chamber and the reservoir, the input shaft comprising a reaction piston having a front end disposed close to the intensifying chamber, and an input plunger slidably fitted inside the inner periphery of the reaction piston and having a rear end which is connected to the brake operating member, the reaction piston and the input plunger having engageable portions which engage each other when the reaction piston retracts through a given distance relative to the input plunger, further comprising a resilient member disposed between the reaction piston and the master cylinder piston for urging the reaction piston forwardly.

In accordance with the first aspect of the invention, the provision of the intensifying means permits the master cylinder pressure to be intensified as required to provide a braking effort of an increased magnitude. In addition, a radial misalignment of the axes of the master cylinder piston and the input shaft is tolerated, permitting a smooth operation.

In accordance with the second aspect of the invention, the provision of the intensifying means which intensifies the master cylinder pressure and the stroke reducing means which reduces the stroke of the input shaft as compared with the stroke of the master cylinder piston allows the master cylinder pressure to be intensified as required to provide braking effort of an increased magnitude while permitting the stroke of the input shaft to be reduced as compared with the stroke of the master cylinder piston when the master cylinder pressure is intensified by the intensifying means.

In accordance with the third aspect of the invention, the provision of the intensifying means allows the master cylinder pressure to be intensified as required to provide a braking effort of an increased magnitude with a simple construction. In addition, since the input shaft is constructed with the reaction piston and the input plunger so that the transmission of a reaction from the pressure in the intensifying chamber to the input shaft is variable, when it is desired to intensify the master cylinder pressure by the intensifying means, a gradient in the pressure intensification at the commencement of the intensifying action can be made higher, allowing the brake to be more effective at the commencement of the intensifying action.

Above and other objects, features and advantages of the invention will become apparent from the following description of several embodiments thereof with reference to the attached drawings.

DETAILED DESCRIPTION OF THE EMBODIMENTS

Figure 1:
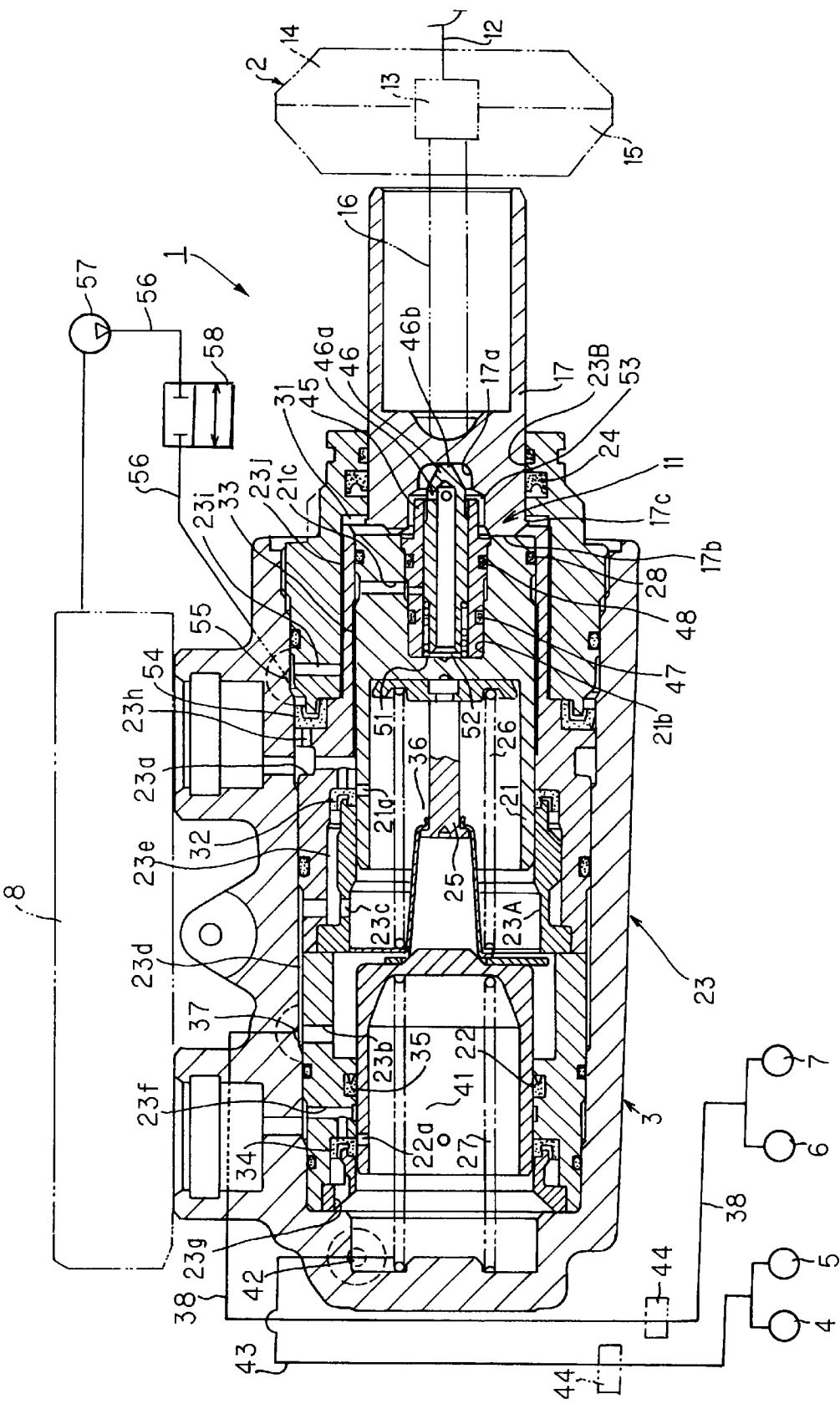
FIG. 1 is a cross section, partly schematic view, of one embodiment of the invention.

Several embodiments of the invention will now be described with reference to the drawings. Referring to FIG. 1, a brake system 1 according to the invention comprises a negative pressure booster 2 which delivers an output by boosting a force of depressing a brake pedal, a master cylinder 3 which is operated by the output from negative pressure booster 2 to generate a master cylinder pressure, wheel cylinders 4 to 7 which are fed with the master cylinder pressure from the master cylinder 3, a reservoir 8 of braking liquid, and intensifying means 11 disposed rearward of the master cylinder 3 for intensifying the master cylinder pressure as required.

The negative pressure booster 2 is a conventional one which is well known in the art and is constructed such that as the break pedal is depressed, an input shaft 12 is driven forward, whereby a flow path in a valve body 13 is switched by a valve mechanism disposed therein to introduce the atmosphere into a variable pressure chamber 14. As a consequence, a pressure differential between a negative pressure in a constant pressure chamber 15 and the atmospheric pressure in the variable pressure chamber 14 drives the valve body 13 forward, whereby an output at a given servo ratio is obtained from an output shaft 16. In the present embodiment, an output from the output shaft 16 is transmitted to the master cylinder 3 through an input shaft 17 which is provided in the intensifying means 11.

The master cylinder 3 is of a tandem type, and includes a primary piston 21 located rearwardly within a housing 23 and a secondary piston 22 located forwardly within the housing 23, in the similar manner as known in the art. The housing 23 of the master cylinder 3 is formed with a larger diameter bore 23A, and a smaller diameter bore 23B which continues from the larger diameter bore 23A and extends to a rear end face thereof, both of which extend axially.

The primary piston 21 and the secondary piston 22 have substantially cup-shaped front openings, the primary piston 21 being slidably fitted into the inner periphery of the larger diameter bore 23A toward the rear end and the secondary piston 22 being slidably fitted into the inner periphery of the larger diameter bore 23A toward the front end thereof.

The input shaft 17 is slidably fitted into the smaller diameter bore 23B of the housing 23, and has a bottomed opening formed in its rear end in axial alignment, and the front end of the output shaft 16 of the negative pressure booster 2 is fitted into the bottomed opening to abut against the bottom of the bottomed opening. An annular seal member 24 is fitted around the inner periphery of the smaller diameter bore 23B to maintain a liquid tightness between the inner periphery of the smaller diameter bore 23B and the input shaft 17. On the other hand, the front end or end face of the input shaft 17 which is located within the larger diameter bore 23A is disposed in abutment against the rear end face of the primary piston 21. Accordingly, as the negative pressure booster 2 is actuated to drive the output shaft 16 forward, the input shaft 17 is driven forward or advances to cause the primary piston 21 and the secondary piston 22 to advance, thereby generating a master cylinder pressure.

An axially telescoping retainer 25 which is known in itself in the art is disposed between the rear end face of the secondary piston 22 and the opposing primary piston 21, and a spring 26 is disposed between radial portions of the retainer 25 at its front and rear ends. In this manner, in the inoperative condition shown in FIG. 1, the secondary piston 22 and the primary piston 21 are maintained in their most axially spaced conditions. A spring 27 is disposed across the front end face of the larger diameter bore 23A and the opposing secondary piston 22. Consequently, in the inoperative condition, the secondary piston 22 and the primary piston 21 assume their inoperative positions shown where the rear end face of the primary piston 21 abuts against the front end face of the opposing input shaft 17 and thus is located rearmost within the larger diameter bore 23A. Accordingly, the input shaft 17 also assumes the rearmost inoperative position relative to the housing 23.

An annular seal member 28 is fitted around the outer periphery of the primary piston 21 toward its rear end, whereby a liquid tightness is maintained between the inner periphery of the larger diameter bore 23A and the outer periphery of the primary piston 21 at the location where the seal member 28 is fitted. In the present embodiment, the internal space within the larger diameter bore 23A, which is located rearward of the location of the seal member 28, defines an intensifying chamber 31.

An annular groove is formed in the inner periphery of the larger diameter bore 23A at an axially central position, and an annular cup seal 32 which is channel-shaped in section is fitted in the annular groove. The inner periphery of the cup seal 32 is held in close contact with the outer periphery of the primary piston 21, thus maintaining a liquid tightness thereat. The internal diameter of the inner periphery of the larger diameter bore 23A is increased in the manner of an annular groove having an increased extent from a point adjacent to and rearward of the cup seal 32 to a point adjacent to and forward of the seal member 28 in the inoperative condition shown, forming an annular space between the inner periphery of the larger diameter bore 23A having its diameter increased and the outer periphery of the primary piston 21 which is located adjacent to and radially inward thereof, which defines a first annular liquid chamber 33. The first annular liquid chamber 33 communicates with the reservoir 8 through a continuing stepped radial bore 23a, whereby a braking liquid in the reservoir 8 is normally introduced into this chamber.

Toward the front end, the larger diameter bore 23A is formed with an annular groove in its inner periphery, in which an annular cup seal 34 which is channel-shaped in section is fitted. The inner periphery of the cup seal 34 is held in close contact with the outer periphery of the secondary piston 22, thus maintaining liquid tightness thereat. The inner periphery of the larger diameter bore 23A is also formed with another annular groove at a location rearward of the cup seal 34, in which an annular seal member 35 is fitted, which is effective to maintain a liquid tightness between this annular groove and the outer periphery of the secondary piston 22.

In a region extending from the seal member 35 to the rearwardly located cup seal 32, the internal space within the larger diameter bore 23A and the internal space of the primary piston 21 which communicates therewith define together a first liquid pressure chamber 36. Radial openings 23b and 23c are formed to continue from the first liquid pressure chamber 36 and communicate with an annular opening 23d, which in turn communicates with a first output port 37, which in turn communicates with rear wheel cylinders 6 and 7 through a conduit 38.

An axial opening 23e is formed to connect between the radial openings 23c and 23a in a manner crossing the annular groove in which the cup seal 32 is fitted. The cup seal 32 is channel-shaped in section, and functions as a check valve which permits a flow of fluid in a direction from the rear side to the front side thereof. Accordingly, the braking liquid in the reservoir 8 is introduced into the first liquid pressure chamber 36 through the radial opening 23a, the axial opening 23e, the cup seal 32 and the radial opening 23c, and thence supplied through the both radial openings 23b and 23c, the annular opening 23d and the conduit 38 into the wheel cylinders 6 and 7.

To ward the front end, the primary piston 21 is formed with a radial opening 21a which communicates with the internal space thereof, and which has an outer opening which is located in the inoperative condition shown to axially straddle the rear end face of the cup seal 32 and remains at rest at this position. A radial clearance is normally maintained between the rear end face of the cup seal 32 and the rear end face of the annular groove in which it is fitted. Accordingly, in the inoperative condition shown, a communication is normally maintained between the reservoir 8 and first liquid pressure chamber 36 through the radial opening 21a, a space located adjacent to and rearward of the cup seal 32 and the rearwardly located axial opening 23e and radial opening 23a, and thus the braking liquid of an atmospheric pressure is accumulated in the first liquid pressure chamber 36.

A second liquid pressure chamber 41 is defined by the internal space of the larger diameter bore 23A in a region located forwardly of the cup seal 34 and the internal space of the secondary piston 22 which communicates therewith. The second liquid pressure chamber 41 is always maintained in communication with the front wheel cylinders 4 and 5 through a second discharge port 42 and a conduit 43 connected thereto.

A radial opening 23f which communicates with the reservoir 8 is located between the cup seal 34 and the seal member 35. An axial opening 23g which continues to the radial opening 23f is formed in crossing relationship with the annular groove in which the cup seal 34 is fitted, and has a front end which is maintained in communication with the second liquid pressure chamber 41. The cup seal 34 is channel-shaped in section, and functions as a check valve which only permits a flow of braking liquid in a direction from the rear side to the front side thereof. Accordingly, the braking liquid in the reservoir 8 is introduced into the second liquid pressure chamber 42 through the radial opening 23f, the axial opening 23g and the cup seal 34, and is thence supplied to the wheel cylinders 4 and 5 through the conduit 43.

Toward the front end, the secondary piston 22 is formed with a radial opening 22a which communicates with the internal space thereof, and which has an outer opening which comes to a stop at a location axially straddling the rear end face of the cup seal 34 in the inoperative condition shown. A radial clearance is maintained between the rear end face of the cup seal 34 and the end face of the annular groove in which it is fitted. Accordingly, in the inoperative condition shown, a communication is established between the reservoir 8 and the second liquid pressure chamber 41 through the radial opening 22a, a space communicating therewith and located rearward of the cup seal 34 and the rearwardly located axial opening 23g and radial opening 23f, and thus the braking liquid of an atmospheric pressure is accumulated in the second liquid pressure chamber 41.

As contrasted to the inoperative condition shown, in the operative condition where the primary piston 21 and the secondary piston 22 advance, the radial opening 21 in the primary piston 21 moves forwardly of the cup seal 32 and the radial opening 22 in the secondary piston 22 moves forwardly of the cup seal 34. As a consequence, the inner periphery of the cup seal 32 is held in close contact with the outer periphery of the primary piston 21 at a location rearward of the radial opening 21a to interrupt the communication between the first liquid pressure chamber 36 and the reservoir 8, and the inner periphery of the cup seal 34 is held in close contact with the outer periphery of the secondary piston 22 at a location rearward of the radial opening 22a to interrupt the communication between the second liquid pressure chamber 41 and the reservoir 8. In this manner, a master cylinder pressure is generated within the first liquid pressure chamber 36 and the second pressure chamber 41, and is supplied through the conduits 38 and 43 to the wheel cylinders 4 to 7, thus producing a braking effort. In the present embodiment, liquid pressure control means 44 which are known to provide an antiskid control are disposed in the conduits 38 and 43. By controlling the operation of the liquid pressure control means 44 using a controller, not shown, it is possible to provide the antiskid control.

In the present embodiment, the intensifying means 11 is disposed toward the rear of the primary piston 21, and can be used to cause the primary piston 21 and the secondary piston 22 to advance as required to intensify the braking liquid pressure.

Specifically, the rear end face of the primary piston 21 is formed with an axial bottomed opening 21b in axial alignment, and a front portion of a cylindrical sleeve 45 is inserted into the bottomed opening 21b from the rear side to be secured in an integral manner therewith. A pair of axially spaced annular seal members 47 and 48 are fitted in the outer periphery of the sleeve 45 to maintain a liquid tightness between the outer periphery of the sleeve 45 and the inner periphery of the bottomed opening 21b. A radial opening 21c which continues to the sleeve 45 and the primary piston 21 is formed between the locations of the annular seal members 47 and 48, and permits a communication to be established between the first annular liquid chamber 33 and the inner periphery of the sleeve 45.

The outer periphery of the sleeve 45 projects rearwardly beyond the rear end face of the primary piston 21 so as to be located close to the intensifying chamber 31, and a spool valve 46 in the form of a bottomed cylinder is fitted into the sleeve 45 from the rear side so as to be slidable therein. The spool valve 46 is fitted into the sleeve 45 so that its opening is located forward and a front portion of the spool valve 46 located adjacent to the opening has its outer periphery reduced in its diameter as compared with the diameter of the outer periphery at the rear end thereof. A spring 51 is disposed in surrounding relationship with the portion of the reduced diameter between the bottom of the bottomed opening 21b and the opposing stepped end face of the spool valve 46, and normally urges the spool valve 46 rearward.

A reaction chamber 52 is defined by a space which is surrounded by the bottom of the bottomed opening 21b and a portion of the inner periphery of the sleeve 45 which is located adjacent to and rearward thereof. The reaction chamber 52 is maintained in communication with the internal space of the spool valve 46 and also maintained in communication with a space defined by the outer periphery of the spool valve 46 in a region having a reduced diameter and the inner periphery of the surrounding sleeve 45 in which the spring 51 is disposed. Toward its rear end, the outer periphery of the spool valve 46 is formed with a radial opening 46a which provides a communication between the inside and the outside thereof, and a rear end of the spool valve 46 is shaped into a conical configuration having a decreasing diameter with its tip 46b formed to be substantially semi-spherical.

On the other hand, the front end face of the input shaft 17 is formed with a stepped bottomed opening 17a having a decreasing diameter in a rearward direction in axial alignment. In the inoperative condition shown, the rear end of the sleeve 45 and the rear end (or tip 46b) of the spool valve 46 which projects rearwardly beyond the sleeve 45 are inserted into the bottomed opening 17a in the input shaft 17, with the tip 46b of the spool valve 46 being disposed in abutment against the bottom of the bottomed opening 17a. At its front end face, the input shaft 17 is formed with an annular projection 17b in axial alignment therewith which surrounds the opening of the bottomed opening 17a and projecting forwardly therefrom. A notch radially extends through the annular projection 17b. In this manner, a communication is maintained between the intensifying chamber 31 and the reaction chamber 52 through the notch in the annular projection 17b, a space 53 formed between the inner periphery of the bottomed opening 17a, the tip 46b of the spool valve 46 and the outer periphery of the sleeve 45, the radial opening 46a through the spool valve 46 and the internal space of the spool valve 46. In the inoperative condition shown, the inner end of the radial opening 21c is closed by a portion of the outer periphery of the spool valve 46 located adjacent to and rearward of the spring 51 and serving as a valve element. Accordingly, the communication between the reservoir 8, the reaction chamber 52 and the intensifying chamber 31 which would be established through the radial opening 21c, the first annular liquid chamber 33 and the radial opening 23a is interrupted.

Thus it will be seen that in the present embodiment, the rear end of the spool valve 46 is sharpened to be conical, with its tip 46b being formed to be semi-spherical to abut against the bottom of the bottomed opening 17a in the input shaft 17. Accordingly, if there is a radial misalignment between the axis of the input shaft 17 and the axes of the primary piston 21 and the spool valve 46, a resulting eccentricity can be tolerated without causing any trouble.

At its front end face, the outer periphery of the input shaft 17 slightly bulges radially outward to provide a flange-like stop 17c. The stop 17c has an external diameter which is chosen to be greater than the internal diameter of the smaller diameter bore 23B, thus preventing the input shaft 17 from being withdrawn rearwardly from the smaller diameter bore 23B.

The housing 23 is formed with an axial opening 23h which continues from the radial opening 23a in the rearward direction, and a radial opening 23i continues from the rear end of the axial opening 23h to extend in a radial direction. The radial opening 23i continues to an annular opening 23j which surrounds the larger diameter bore 23A, and the rear end of the annular opening 23j opens into the larger diameter bore 23A so as to communicate with the intensifying chamber 31. An annular groove is formed in a manner crossing the axial opening 23h, and a cup seal 54 which is C-shaped in section is fitted in the annular groove. The cup seal 54 functions as a check valve which only permits a flow of braking liquid in a direction from the front side to the rear side. Accordingly, the braking liquid in the reservoir 8 is supplied into the intensifying chamber 31 through the radial opening 23a, the axial opening 23h, the cup seal 54, the radial opening 23i and the annular opening 23j. By contrast, the braking liquid in the intensifying chamber 31 can not be returned to the reservoir 8 through the path mentioned immediately above.

The housing 23 is formed with a communication opening 55 which continues from the radial opening 23i, and communicates through a conduit 56 to a pump 57. A normally closed solenoid operated valve 58 is disposed in the conduit 56.

The operation of the solenoid valve 58 and the pump 57 is controlled by a controller, not shown, which is designed to operate the pump 57 and the solenoid valve 58 as required.

Under the condition shown in FIG. 1 in which the radial opening 21c is closed by the outer periphery of the spool valve 46 or the reaction chamber 52 is not in communication with the reservoir 8, as the controller operates the pump 57 and opens the solenoid valve 58, a discharge pressure from the pump 57 is supplied to the intensifying chamber 31 and the reaction chamber 52. As the discharge pressure from the pump 57 is supplied to the intensifying chamber 31, the primary piston 21 and the secondary piston 22 are caused to advance, whereupon the master cylinder pressure in the first liquid pressure chamber 36 and the second liquid pressure chamber 41 is intensified.

It will be appreciated from the forgoing description that the intensifying means 11 of the present embodiment comprises the intensifying chamber 31, the sleeve 45, a control valve as formed by the spool valve 46, the reaction chamber 52, the pump 57, the solenoid valve 58 and the input shaft 17.

Operation

With the described arrangement, in the inoperative condition where a brake pedal is not depressed, the components of the brake system 1 assume their inoperative positions shown in FIG. 1. Under this condition, the pump 57 is not operated, and the solenoid valve 58 remains closed. The primary piston 21 and the secondary piston 22 which are urged by the springs 27 and 26 are maintained in their rearmost retracted positions, with the end face of the primary piston 21 abutting against the annular projection 17b of the input shaft 17, whereby the input shaft 17 and the output shaft 16 of the negative pressure booster 2 which is abutting against it are located at their retracted rear positions. Since the spool valve 46 is urged rearward by the spring 51, the front end of the spool 46 is spaced from the bottom of the bottomed opening 21b while the tip 46b of the spool valve 46 abuts against the bottom of the bottomed opening 17a formed in the input shaft 17. The stop 17c of the input shaft 17 is slightly spaced from the stepped end face of the larger diameter bore 23A which is located adjacent to and rearward thereof. Since the braking liquid is designed to be supplied from the reservoir 8 to the intensifying chamber 31 through a flow path including the rear cup seal 54, both the intensifying chamber 31 and the reaction chamber 52 assume an atmospheric pressure. The radial path 21c is closed by the outer periphery of the spool valve 46, and accordingly, the communication between the reaction chamber 52 and the reservoir 8 through the radial path 21c is interrupted. The first liquid pressure chamber 36 and the second liquid pressure chamber 41 of the master cylinder 3 communicate with the reservoir 8 and thus assume an atmospheric pressure.

Normal Brake Operation

When a brake pedal is gently depressed under the inoperative condition, the negative pressure booster 2 is actuated, driving the output shaft 16 forward. In response thereto, the input shaft 17 is driven forward, causing the primary piston 21 and the secondary piston 22 to advance under the influence of the output from the output shaft 16.

Consequently, the radial opening 21a in the primary piston 21 moves forwardly of the cup seal 32 and the radial opening 22a in the secondary piston 22 moves forwardly of the cup seal 34. Consequently, a communication between the first liquid pressure chamber 36 and the reservoir 8 is interrupted, and a communication between the second liquid pressure chamber 41 and the reservoir 8 is interrupted. In this manner, a master cylinder pressure is generated in the first liquid pressure chamber 36 and the second liquid pressure chamber 41, and is supplied to the wheel cylinders 4, 5, 6 and 7, thus obtaining a braking effort in a usual manner.

As the primary piston 21 advances, the volume of the intensifying chamber 31 increases, and accordingly, the intensifying chamber 31 tends to assume a negative pressure, but because the braking liquid from the reservoir 8 is fed through the flow path including the cup seal 54 to replenish the intensifying chamber 31, the atmospheric pressure is maintained within the intensifying chamber 31. Accordingly, it is possible to allow the primary piston 21 to advance smoothly.

Subsequently, as the brake pedal is released, the negative pressure booster 2 becomes deactuated, and the output shaft 16 and the input shaft 17 retract rearwardly to their inoperative positions.

At the time when the output shaft 16 and the input shaft 17 begin to retract, both the reaction chamber 52 and the intensifying chamber 31 are isolated from the reservoir 8 and are sealed, and accordingly, the primary piston 21 and the secondary piston 22 do not retract. Subsequently, as the output shaft 16 and the input shaft 17 further retract, the spool valve 46 which is urged by the spring 51 moves rearward relative to the sleeve 45 and the primary piston 21 while maintaining its tip 46b in abutment against the bottom of the bottomed opening 46b in the input shaft 17. This brings a portion of the spool valve 46 having a reduced diameter to the location of the inner end of the radial opening 21c, whereby the reaction chamber 52 communicates with the reservoir 8 through the path including the radial opening 21c. Consequently, both the primary piston 21 and the secondary piston 22 retract rearwardly while displacing the braking liquid in the reaction chamber 52 and the intensifying chamber 31 to the reservoir 8. Accordingly, the braking effort produced by the respective wheel cylinder 4, 5, 6 or 7 is reduced. When each of the pistons 21 and 22 retracts to the inoperative position shown, both the first liquid pressure chamber 36 and the second liquid pressure chamber 41 communicate with the reservoir 8 to assume an atmospheric pressure, whereby the brake system 1 assumes the inoperative condition shown, thus releasing the brake.

An input/output characteristic of the master cylinder 3 during the normal brake operation mentioned above can be represented by the following equation:

$$P = F/A - SPG1/A \tag{1}$$

where P represents a master cylinder pressure, F represents an output from the negative pressure booster 2 acting upon the input shaft 17, A represents a cross-sectional area of the master cylinder piston (assuming that both the primary piston 21 and the secondary piston 22 have an equal cross-sectional area) and SPG1 represents the resilience of the rear spring 26, and which equation is derived from the equilibrium of the primary piston 21.

Brake Assisting Operation

The present embodiment utilizes a controller, not shown, as mentioned above, and in addition uses detection means for detecting the rising rates of a force of depression applied to a brake pedal, a pedal stroke and the like. Such detection means is arranged to supply the rising rates of the force of depression applied to the brake pedal and of the pedal stroke to the controller. If the controller determines that the rising rates of the force of depression applied to the brake pedal and the pedal stroke are higher than those which prevail during a normal brake operation to require a brake assisting operation such as applying a quick brake operation on the basis of results of detection which are transmitted from the detection means, it operates the pump 57 and opens the solenoid valve 58. Thereupon, the pump 57 feeds the braking liquid to the intensifying chamber 31 through the conduit 56, the radial path 23i and the annular opening 23j. Since the output shaft 16 and the input shaft 17 are already driven forward, whereby the intensifying chamber 31 and the reaction chamber 52 are both isolated from the reservoir 8 and are sealed in a similar manner as mentioned above, the braking liquid which is fed from the pump 57 to the intensifying chamber 31 allows a pressure rise in the intensifying chamber 31 and the reaction chamber 52 to the discharge pressure of the pump 57.

When the discharged pressure of the pump 57 prevails in the intensifying chamber 31 and the reaction chamber 52, the primary piston 21 and the secondary piston 22 are caused to advance, whereby a master cylinder pressure is generated in the first liquid pressure chamber 36 and the second liquid pressure chamber 41 to actuate the brake in the similar manner as mentioned previously. The discharge pressure from the pump 57 which prevails in the intensifying chamber 31 drives the input shaft 17 and the output shaft 16 back, whereby the spool valve 46 moves rearwardly to allow a communication between the reaction chamber 52 and the reservoir 8, thus restricting the flow of the discharge liquid from the reaction chamber 52 into the reservoir 8. Thus, the discharge pressure of the pump 57 which is applied to the intensifying chamber 31 is controlled so that the reaction of the discharge pressure from the pump 57 which prevails in the intensifying chamber 31 upon the input shaft is balanced with the input applied to the input shaft 17.

Since a pressure responsive area of the primary piston 21 which is subject to the discharge pressure from the pump 57 is equal to a pressure responsive area of the primary piston 21 which is subject to the master cylinder pressure, it follows that the master cylinder pressure is equal to the pump discharge pressure.

Accordingly, the input/output characteristic of the master cylinder 3 during the brake assisting operation can be derived from the equilibrium of the input shaft 17 as represented by the following equality:

$$P = F/B - SPG2/B \quad (2)$$

where P represents a master cylinder pressure or pump discharge pressure, F an input applied to the input shaft 17 or an output from the negative pressure booster 2, B a cross-sectional area of the input shaft 17, and SPG2 the resilience of the spring 51.

Comparing the equation (2) with the equation (1) which applies for the normal brake operation, it will be seen that the servo ratio is greater during the brake assisting operation than for the normal brake operation because B<A. Accordingly, it is seen that with the brake system 1 of the present embodiment, a brake assisting operation can be reliably performed.

During the brake assisting operation, if the brake pedal is subsequently released, a signal from the detection means causes the controller to deactivate the pump 57 and to close the solenoid valve 58. This results in sealing both the intensifying chamber 31 and the reaction chamber 52.

Subsequently, in the similar manner as the normal brake operation is released, the output shaft 16 and the input shaft 17 retract initially, followed by a retracting movement of the spool valve 46 to establish a communication between the radial opening 21c and the reaction chamber 52. This allows both the intensifying chamber 31 and the reaction chamber 52 to communicate with the reservoir 8, whereby the primary piston 21 and the secondary piston 22 retract, and the negative pressure booster 2 and the master cylinder 3 return to their inoperative conditions shown, releasing the brake.

Negative Pressure Default

Although not shown, a negative pressure sensor is provided in the present embodiment, and in the event the source of the negative pressure falls below a given value as by default, the sensor notifies the controller to this effect.

If a detection signal notifying a negative pressure default is transmitted from the negative pressure sensor during the normal brake operation, the controller operates the pump 57 and opens the solenoid valve 58 to feed the discharge pressure from the pump 57 to the intensifying chamber 31. This intensifies the master cylinder pressure to allow a braking effort of an increased magnitude to be obtained if the negative pressure from the source of negative pressure falls below a given value and the output from the negative pressure booster 2 decreases correspondingly.

Figure 2:
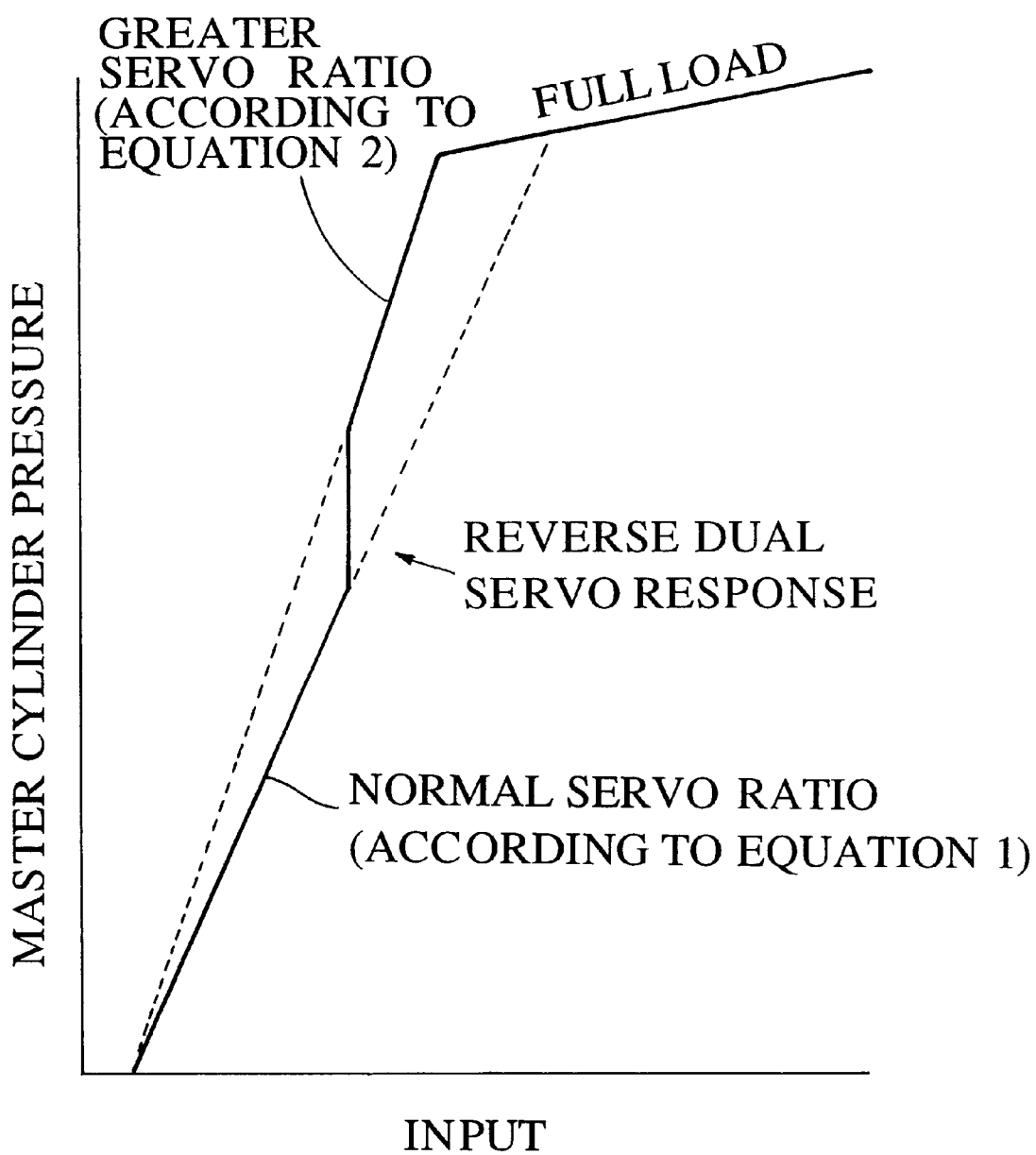
FIG. 2 is a characteristic diagram of a brake system shown in FIG. 1.

When during the normal brake operation, the master cylinder pressure rises with a usual servo ratio relative to the force of depression applied to the brake pedal (or input), it is possible to achieve a reverse dual servo ratio characteristic in which the master cylinder pressure rises with a servo ratio greater than a usual servo ratio for an input equal to or greater than a given value, as shown in FIG. 2. Specifically, there may be a pedal stroke sensor which detects the depression stroke of the brake pedal, a depression force sensor which detects the force of depressing the brake pedal, a pressure sensor which detects a master cylinder pressure or any other pressure, not shown, which detects a desired input so that during the normal brake operation which takes place at a usual servo ratio, any input detection signal or signals supplied from the described sensors may be used to open the solenoid valve 58 and to operate the pump 57 in the similar manner as mentioned above in connection with the brake assisting operation, whenever the controller detects an input in excess of a given value representing a break point in the servo ratio. Thereupon, the servo ratio is changed from the usual servo ratio represented by the equation (1) to a greater servo ratio represented by the equation (2), in the manner illustrated in FIG. 2. In this manner, a braking effort of a greater magnitude can be obtained for an input in excess of a given value.

Recently the negative pressure tends to decrease as a result of reducing the fuel cost of the engine for automobiles, but the described reverse dual servo ratio characteristic allows a greater master cylinder pressure to be obtained, assuring that a greater braking effort can be obtained if the negative pressure is decreased.

In the present embodiment, the input shaft 17 is formed with the bottomed opening 17a, in which the rear end of the sleeve 45 and the rear end of the spool valve 46 are inserted, with the tip 46b of the spool valve 46 being disposed in abutment against the bottom of the bottomed opening 17a. This arrangement allows the primary piston 21, the input shaft 17 and the spool valve 46 to move smoothly back and forth without involving any difficulty if the axes of the primary piston 21, the sleeve 45 and the spool valve 46 are radially misaligned with respect to the axis of the input shaft 17. In other words, in the present embodiment, a misalignment of the axes of the primary piston 21 and the input shaft 17 can be tolerated.

Figure 3:
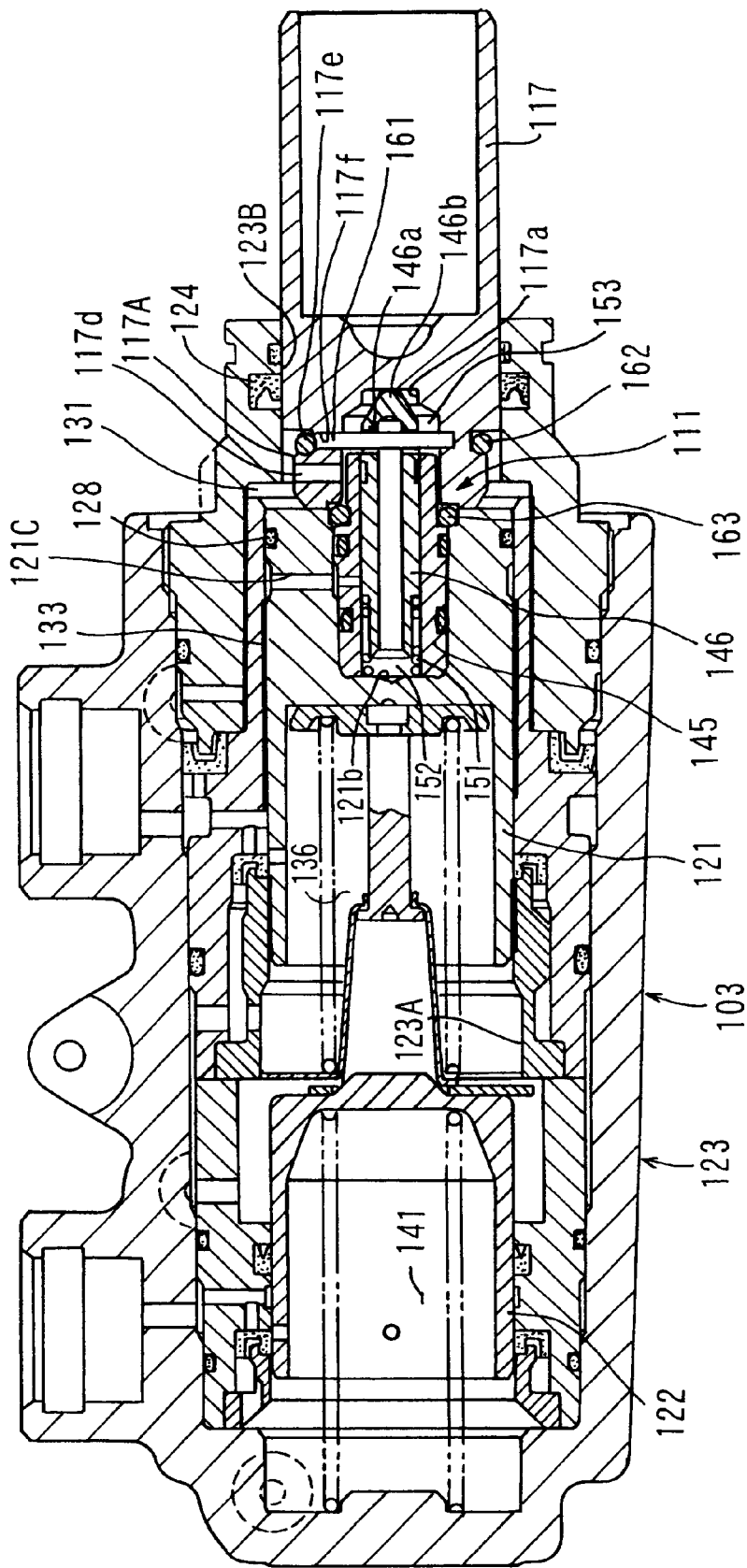
FIG. 3 is a cross section of a second embodiment of the invention.

Since the outer periphery of the input shaft 17 is formed with the stop 17c at the front end face, a withdrawal of the input shaft rearwardly from the smaller diameter bore 23B of the housing 23 can be reliably Second Embodiment FIG. 3 shows a second embodiment of the invention in which an input shaft 117 and a spool valve 146 are connected together by a pin 161. It should be understood that parts corresponding to those shown in the first embodiment are designated by like numerals and characters as used before, to which 100 is added.

Specifically the input shaft 117 has a front portion, the outer periphery of which is formed as a reduced diameter portion 117A having an external diameter which is less than external diameter of a smaller diameter bore 123B of a housing 123. The reduced diameter portion 117A is formed with a radial opening 117d, and an annular groove 117e which is located rearward of the radial opening 117d. A radial opening 117f is provided to allow a pin 161 to be fitted into the annular groove 117e. On the other hand, a spool valve 146 is formed with a radial opening 146a, which radially extends therethrough, at a location adjacent to and forwardly of a tip 146b.

Rectilinear pin 161 is inserted when the radial opening 146a in the spool valve 146 and the radial opening 117f in the input shaft 117 are aligned with each other. Subsequently, the annular groove 117e is engaged by a locking ring 162, thus preventing a withdrawal of the pin 161.

The radial opening 146a in the spool valve 146 has an internal diameter which is greater than the external diameter of the pin 161, maintaining a clearance between the pin 161 and radial opening 146a, which allows a communication between the inside and the outside of the spool valve 146.

In the inoperative condition shown, the front end face of the input shaft 117 is disposed in an abutment against the rear end face of a primary piston 121. In the second embodiment, the front end face of the input shaft 117 is not provided with a radial notch, but is instead provided with the radial opening 117d, which allows a communication between the internal space of a bottomed opening 117a and an intensifying chamber 131 even in inoperative condition shown.

Also in the second embodiment, an annular retainer 163 is fitted at the location of the rear end of a bottomed opening 121b of the primary piston 121, thereby allowing the outer periphery of a sleeve 145 to be more firmly secured in the bottomed opening 121b at its front end.

In other respects, the arrangement is similar to that of the first embodiment shown in FIG. 1. The second embodiment constructed in a manner mentioned above achieves similar function and effect as described above in connection with the first embodiment.

In the both embodiments described above, the both pistons 21, 22 (or 121, 122) of the master cylinder 3 (or 103) have a uniform external diameter over the entire axial extent, but they may be stepped so that the external diameter may be greater toward the rear end than toward the front end where they are disposed close to the respective liquid pressure chambers 36, 41 (or 136, 141).

Third Embodiment

Figure 4:
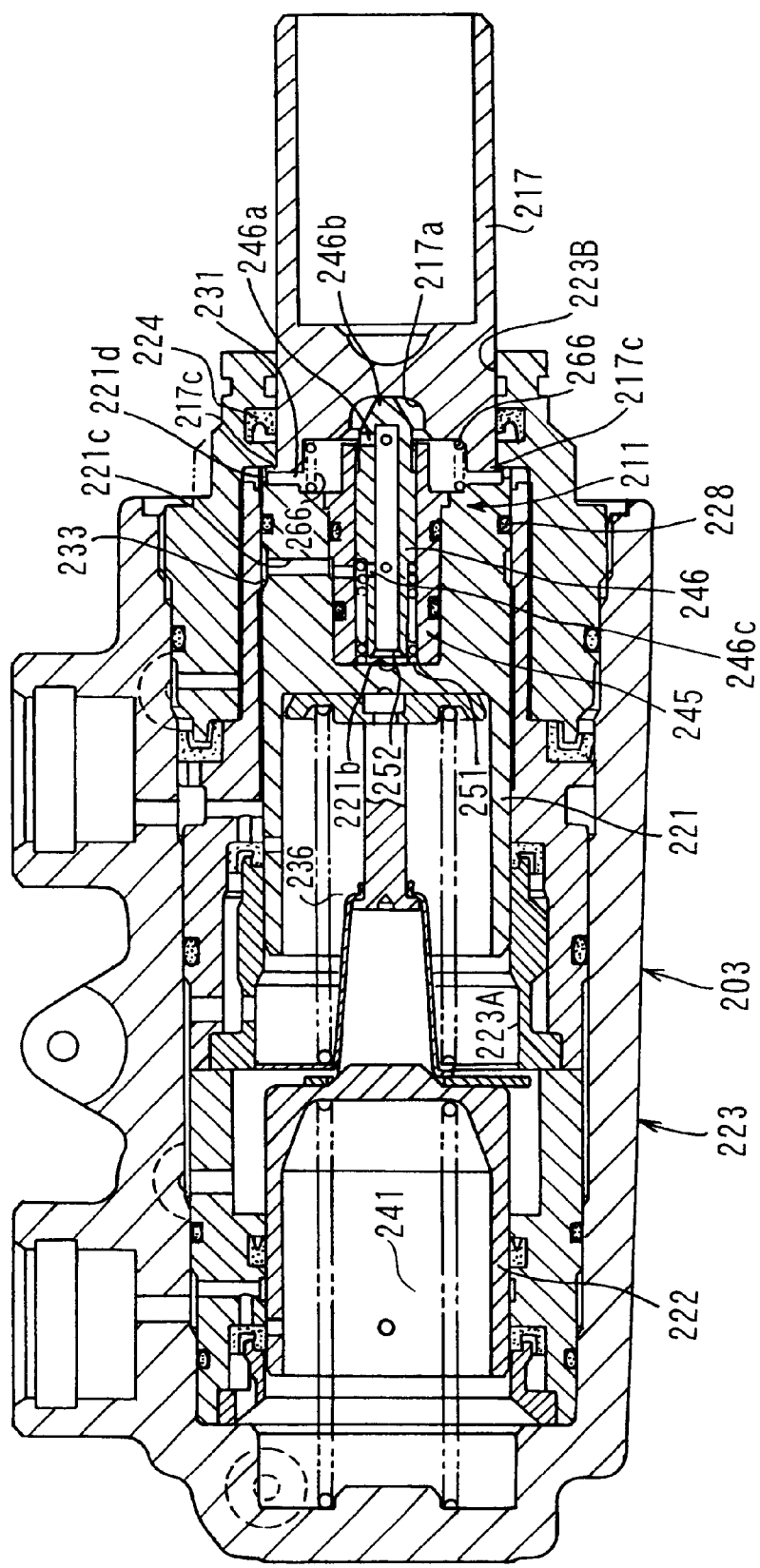
FIG. 4 is a cross section of a third embodiment of the invention.

FIG. 4 shows a third embodiment of the invention. In the two embodiments described above, the communication between the reaction chamber 52 (or 152) and the radial path 21c (or 121c) is interrupted in the inoperative condition, but in the third embodiment, a communication is established between a reaction chamber 252 and a radial path 221c in the inoperative condition, thus providing so-called open center construction. Specifically, a spool valve 246 is formed with a radial opening 246c at a location rearward of a front portion of a reduced diameter thereof, and the radial opening 246c allows a communication between the inside and the outside of the reduced diameter portion of the spool valve 246. In the inoperative condition shown, the inner end of the radial opening 221c overlaps axially with the reduced diameter portion of the spool valve 246, and accordingly, the reaction chamber 252 communicates with a reservoir through a flow path including the radial opening 221c.

The outer peripheral edge of the rear end face of a primary piston 221 is formed with a rearwardly extending tubular portion 221d, which is disposed in abutment against a stepped end face of a larger diameter bore 223A located opposite thereto. Because the tubular portion 221d is formed with a radial notch, the inside and the outside of the tubular portion 221d communicate with each other through the notch. A spring 266 is disposed between the rear end face of the primary piston 221 and the stepped end face of a bottomed opening 217a formed in an opposing input shaft 217, whereby the input shaft 217 retracts to a position where a stop 217c thereon abuts against the stepped end face of the larger diameter bore 223A. Under this condition, the front end face of the input shaft 217 is spaced from the opposing rear end face of the primary piston 221. In other respects, the arrangement is similar to the first embodiment, and corresponding parts to those shown in the first embodiment are designated by like reference numerals and characters as used before, to which 200 is added.

In the third embodiment thus constructed, if the pump pressure is fed from the pump to the intensifying chamber 231 in the inoperative condition shown, the intensifying chamber 231 and the reaction chamber 252 remain at the atmospheric pressure because the intensifying chamber 231 communicates with the reaction chamber 252, which in turn communicates with the reservoir.

On the other hand, when a brake pedal is gently depressed under the inoperative condition shown, the input shaft 217 is driven forward. This compresses the spring 266 to cause the input shaft 217 to abut against the primary piston 221, whereby the radial opening 221c is closed by the outer periphery of the spool valve 246 which is located rearward of the reduced diameter portion. Subsequent operation remains similar to that mentioned above in connection with the normal brake operation of the first embodiment, and therefore will not be specifically given here.

The brake assisting operation of the third embodiment will be described. In this instance, when the input shaft 217 is rapidly driven forward under inoperative conditions shown, the pump pressure is fed to the intensifying chamber 231 under the condition that the radial opening 221c is closed by the outer periphery of the spool valve 246 in the similar manner as during normal operation mentioned above. The discharge pressure from the pump then generates a liquid pressure in the intensifying chamber 231, whereby both pistons 221 and 222 are caused to advance, thus intensifying the master cylinder pressure. Subsequent operation remains similar to what has been mentioned above in connection with the first embodiment and therefore will not be specifically given here.

The third embodiment constructed in the manner mentioned above achieves a similar function and effect as achieved by the first embodiment initially mentioned.

Fourth Embodiment

Figure 5:
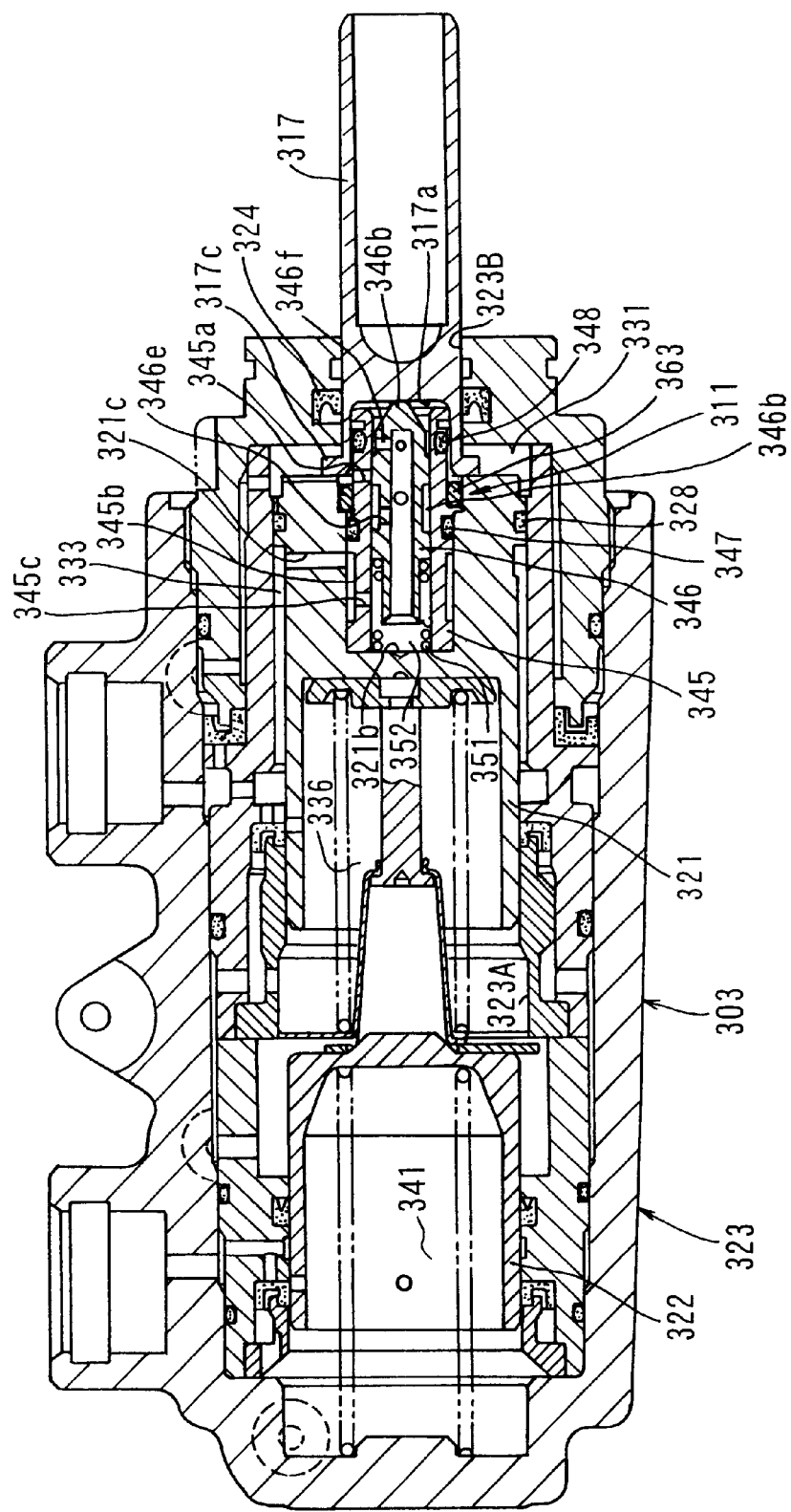
FIG. 5 is a cross section of a fourth embodiment of the invention.
Figure 6:
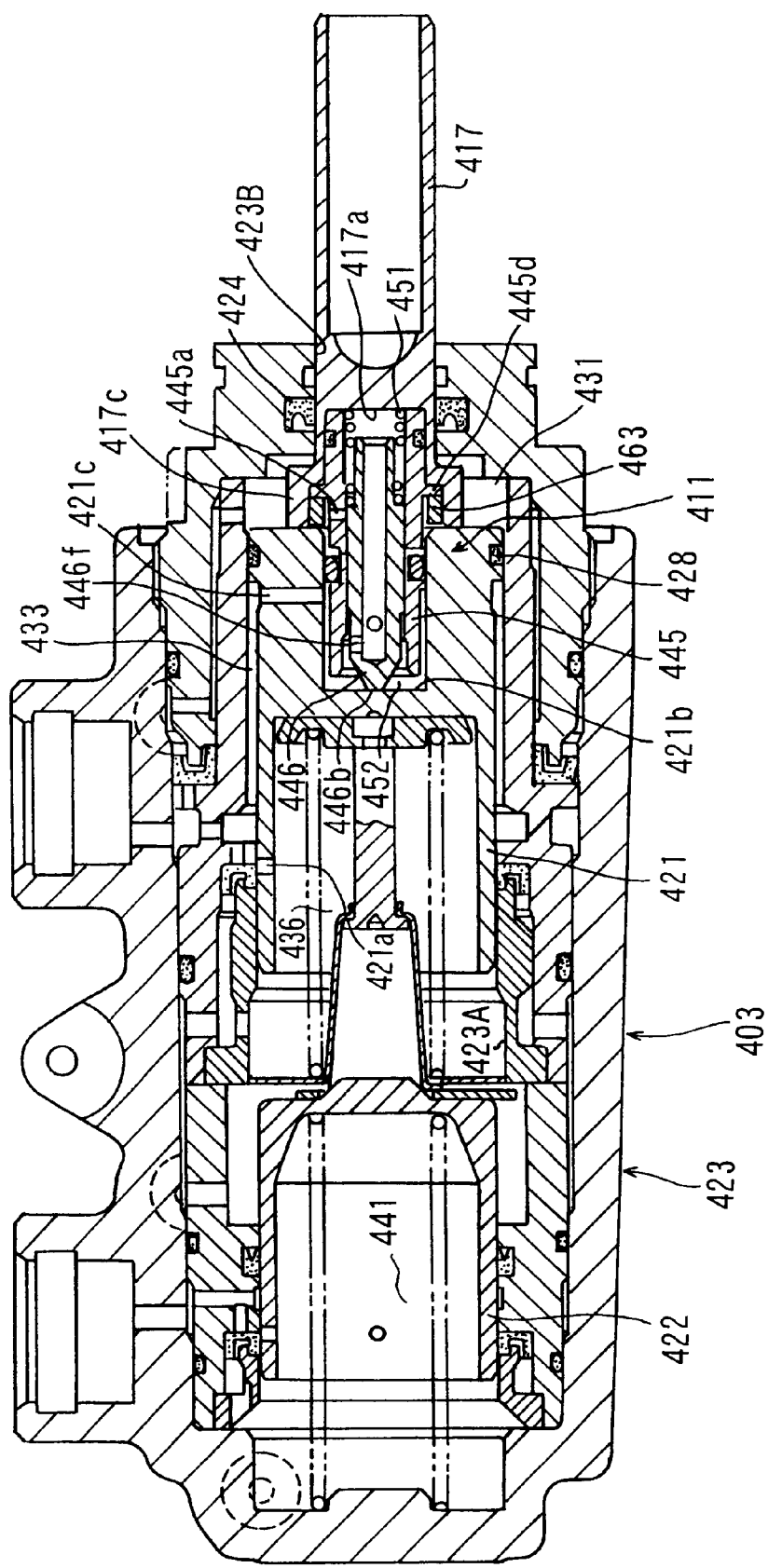
FIG. 6 is a cross section of a fifth embodiment of the invention.
Figure 7:
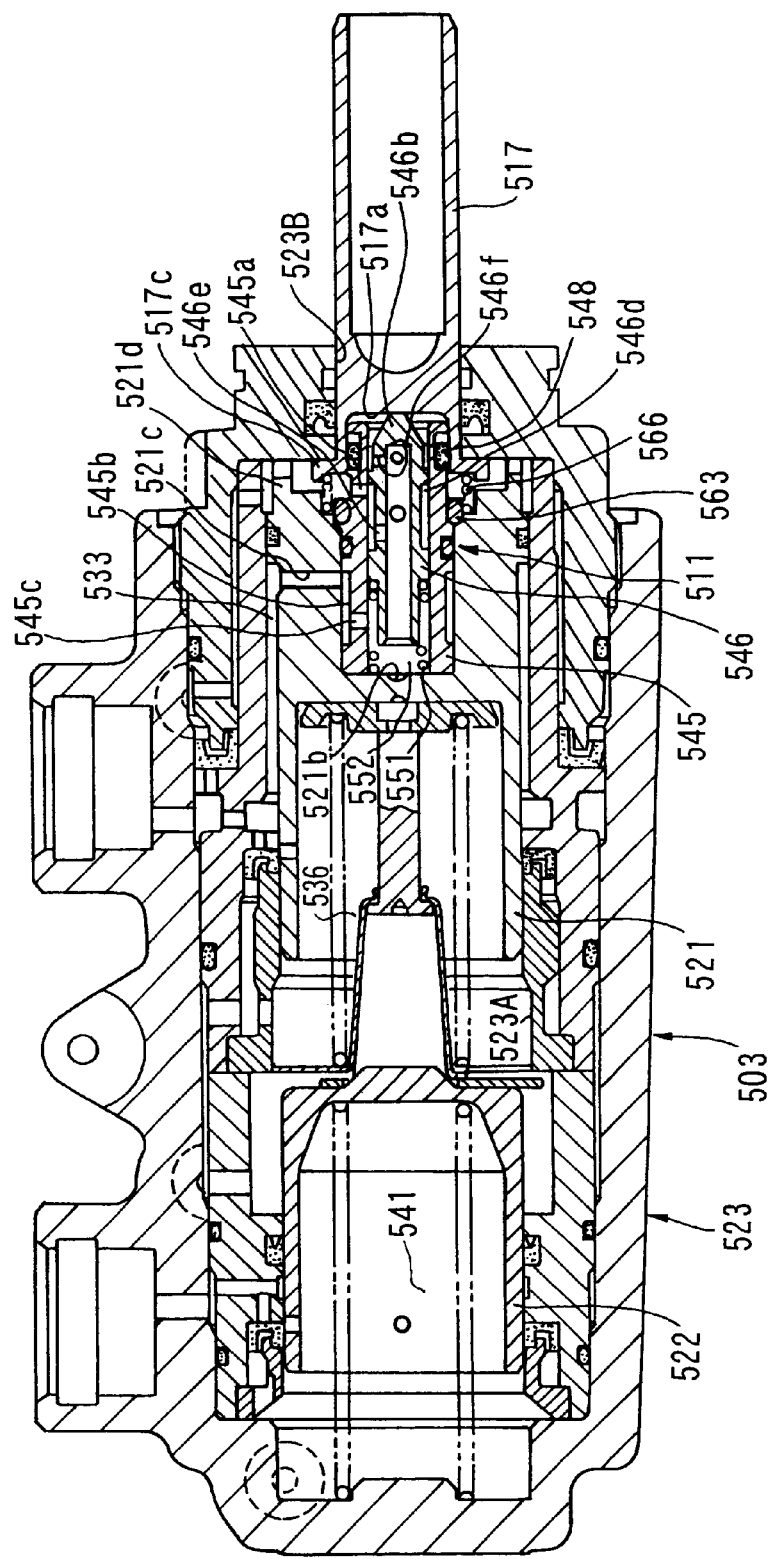
FIG. 7 is a cross section of a sixth embodiment of the invention.

FIGS. 5 to 7 show a fourth, a fifth and a sixth embodiment of the invention, respectively. These embodiments are designed to increase the intensifying ratio during the brake assisting operation than the intensifying ratio obtained with the first to the third embodiment.

Specifically, in the fourth embodiment shown in FIG. 5, a bottomed opening 317a formed in an input shaft 317 has a uniform internal diameter over the entire axial extent thereof, and the outer periphery of a sleeve 345 toward its rear end is slightly fitted into the bottomed opening 317a thus formed. An annular seal member 348 is fitted around the outer periphery of the sleeve 345 toward the rear end thereof, thereby maintaining a liquid tightness between the bottomed opening 317a and the outer periphery of the sleeve 345.

Toward the front end of the input shaft 317, the outer periphery thereof is formed with a flange 317c which has an increasing diameter radially outward.

At a location disposed close to an intensifying chamber 331, the sleeve 345 is formed with a radial opening 345a, which allows a communication between the inside of the sleeve and the intensifying chamber 331.

The outer periphery of a spool valve 346 is centrally formed with an annular groove 346d, and a radial opening 346e is formed in the spool at the location of the annular groove 346d for providing a communication between the inside of the spool valve 34 and the annular groove 346d.

Toward the front end, the outer periphery of the sleeve 345 is formed with an annular groove 345b and a radial opening 345c which continues therefrom. The annular groove 345b is maintained in communication with a radial opening 321c formed in a housing 323. Thus, in the fourth embodiment, a space which has been used as a reaction chamber in the described embodiments are formed as an atmosphere chamber 352, which is maintained in communication with a reservoir.

On the other hand, the spool valve 346 which is urged rearward by a spring 351 has its tip 346d disposed in abutment against the bottom of the bottomed opening 317a. In the inoperative condition, the radial opening 345a formed in the sleeve 345 is closed by a portion of the outer periphery of sleeve valve 346 which is located rearward of the annular groove 346d.

At a point adjacent to and forward of the tip 346b, the outer periphery of the spool 346 has a diameter less than the internal diameter of the sleeve 345 where a radial opening 346f is formed. Accordingly, a communication is established between the atmosphere chamber 352 and the internal space of the bottomed opening 317a formed in the input shaft 317 through the internal space of the spool valve 346 and the radial opening 346f.

In the inoperative condition, the front end face of the flange 317c of the input shaft 317 is disposed in abutment against the rear end face of the primary piston 321. The rear end face of the primary piston 321 is formed with a radial notch, through which a communication is established between intensifying chamber 331 and the radial opening 345a formed in the sleeve 345 in the inoperative condition.

In addition, in the present embodiment, at the location of a seal member 328 and therearound, the primary piston 321 has an external diameter which is greater than the external diameter thereof at a location forwardly thereof. As a consequence of this, a first annular liquid chamber 333 of this embodiment has a volume which is greater than the volume of the first annular liquid chamber 33 (or 133 or 233) of each embodiment described above. It should be understood that parts corresponding to those shown in the first embodiment are designated by like reference numerals and characters as used before, to which 300 is added.

In other respects, the arrangement is similar to the arrangement shown in connection with the first embodiment.

As a result of the described arrangement of the present embodiment, it is possible to increase the intensifying ratio by the intensifying means 311 in the present embodiment as compared with the first to the third embodiment.

Specifically, referring to the embodiment shown in FIG. 1, denoting an input from the input shaft 17 by F, a liquid pressure in the intensifying chamber 31 by P, a pressure responsive area of the primary piston 21 in the master cylinder 3 by A and a pressure responsive area of the input shaft 17 by B, it follows that during the normal brake operation, the balance for the input shaft 17 is achieved by $F=P\times A.$ On the other hand, during the brake assisting operation, the balance for the input shaft 17 is achieved by $F=P\times B.$ Accordingly, the intensifying ratio is provided by A/B.

However, if it is attempted to increase the intensifying ratio (A/B) with the arrangement of the first embodiment, it is necessary to reduce the external diameter of the input shaft 17. However, a reduction in the diameter of the input shaft 17 results in a reduced strength of the input shaft 17, which is difficult to implement in actuality.

By contrast, in the fourth embodiment shown in FIG. 5, the discharge pressure from the pump which prevails in the intensifying chamber 331 acts upon only a pressure responsive area of the input shaft 317 which is located radially outward of the outer periphery of the sleeve 345 when the pump pressure is introduced into the intensifying chamber 331 during the brake assisting operation.

In other words, in the forth embodiment shown in FIG. 5, denoting an input from the input shaft 317 by F, a liquid pressure in the intensifying chamber 331 by P, a pressure responsive area of the primary piston 321 in the master cylinder 303 by A, a cross-sectional area of a sliding portion of the input shaft 317 by B and a cross-sectional area of the input shaft 317 located radially outward of the outer periphery of the sleeve 345a by C, the balance for the input shaft 317 during the normal brake operation is achieved by $F=P\times A$ On the other hand, during the brake assisting operation, the balance for the input shaft 317 is achieved by $F=P\times A\times (B-C)/(A-C).$ Accordingly, the intensifying ratio is given by (A−C)/(B−C).

Since C<B<A, it follows that A/B<(A−C)/(B−C). This means that it is possible in the fourth embodiment to increase the intensifying ratio as compared with the arrangement of the first embodiment.

It should be understood that the fourth embodiment is also capable of achieving a similar function and effect as achieved by the first embodiment.

Fifth Embodiment

FIG. 6 shows a fifth embodiment of the invention. In the fourth embodiment, the sleeve 345 is fitted into and secured to the bottomed opening 321a in the primary piston 321 while the outer periphery thereof toward the rear end is slidably fitted into the bottomed opening 317a formed in the input shaft 317. However, in the fifth embodiment, the rear end of a sleeve 445 is fitted into and secured to a bottomed opening 417a formed in an input shaft 417 while the outer periphery of the sleeve 445 toward the front end thereof is slidably fitted into a bottomed opening 421b formed in a primary piston 421.

In conjunction with this, a spool valve 446 has its tip 446b directed forwardly and disposed in abutment against the bottom of the bottomed opening 421b of the primary piston 421. A spring 451 is disposed between the bottom of the bottomed opening 417a formed in the input shaft 417 and a step on the spool valve 446, thus urging the spool valve 446 forwardly. The spool valve 446 is formed with a radial opening 446f at a location adjacent to the tip 446b, thereby maintaining a communication between an atmosphere chamber 452 and the internal space of the spool valve 446 and the interior of the bottomed opening 417a.

In the fifth embodiment, toward the front end, the outer periphery of the input shaft 417 is provided as a bottomed tubular portion 417c which is by a given amount greater in diameter than the external diameter of the sleeve 445. The rear end of the sleeve 445 and a flange 445d located adjacent to and forwardly thereof are fitted into the bottomed opening 417a formed in the input shaft 417 which is stepped, and a retainer 463 is fitted over the flange 445d from the front side thereof. A clearance is maintained between the inner periphery of the retainer 463 and the outer periphery of the sleeve 445, and the sleeve 445 which is located radially inward thereof is formed with a radial opening 445a, which allows a communication to be maintained between an intensifying chamber 431 and the interior of the sleeve 445.

In the inoperative condition shown, the radial opening 445a is closed by the outer periphery of the spool valve 446.

Also in the fifth embodiment, the pressure in the intensifying chamber 431 is acting only upon a pressure responsive portion of the input shaft 417 which is located radially outward of the outer periphery of the sleeve 445, thus achieving the similar function and the effect as achieved by the fourth embodiment. The fifth embodiment is also capable of achieving the similar function and the effect as achieved by the first embodiment. It should be understood that corresponding parts to those shown in the first embodiment are designated by like reference numerals and characters as used before, to which 400 is added.

It is to be noted that in the fifth embodiment, the outer periphery of the primary piston 421 has a greater diameter at the location where a seal member 428 is fitted than the external diameter toward the front end thereof where the radial opening 421a is formed, but the external diameter of the primary piston 421 may be uniform over the entire axial extent thereof.

Sixth Embodiment

FIG. 7 shows a combination of the so-called open center construction shown in FIG. 4 and the arrangement shown in FIG. 5 which allows the intensifying ratio to be increased.

Specifically, in the inoperative condition shown, a rear tubular portion 521d of a primary piston 521 is disposed in abutment against a stepped end face of a larger diameter bore 523A of a housing 523. A spring 566 is disposed between a rear end face of the primary piston 521 and a flange 517c on an input shaft 517, causing the rear end face of the flange 517c to abut against the stepped end face on the larger diameter bore 523A of the housing 523.

A sleeve 545 and a spool valve 546 are constructed in the similar manner as shown in FIG. 5. In other respects, the arrangement is similar to that shown in FIG. 5, and corresponding parts to those shown in the first embodiment are designated by like reference numerals and characters as used before, to which 500 is added.

The sixth embodiment thus constructed is also capable of achieving a similar function and effect as achieved by the fifth embodiment, and is also capable achieving a similar function and effect as achieved by the first embodiment.

In the embodiments described above, a cylindrical sleeve 45 (or 145, 245, 345, 445, 545) is fitted into a bottomed opening 17a (or 117a, 217a, 317a, 417a, 517a) in an input shaft 17 (or 117, 217, 317, 417, 517) or into a bottomed opening 21b (or 121b, 221b, 321b, 421b, 521b) in a primary piston 21 (or 121, 221, 321, 421, 521) so that the inner periphery of the sleeve 45 (or 145, 245, 345, 445, 545) serves as a guide opening during sliding movement thereof, but the bottomed opening 17a (or 117a, 217a 317a 417a, 517a) in the input shaft 17 (or 117, 217, 317, 417, 517) or the bottomed opening 21b (or 121b, 221b, 321b, 421b, 521b) in the primary piston 21 (or 121, 221, 321, 421, 521) may be integrally formed with a portion which corresponds to the sleeve 45 (or 145, 245, 345, 445, 545).

Alternatively, while the output shaft 16 of the negative pressure booster 2 is fitted into the input shaft 17 (or 117, 217, 317, 417, 517) in the brake system 1, a liquid-pressure booster may be provided in place of the negative pressure booster 2, with its output shaft being fitted into the input shaft 17.

As a further alternative, rather than providing the negative pressure booster 2 or liquid pressure booster, an input shaft coupled to a brake pedal may be directly fitted into the input shaft 17.

Seventh Embodiment

Figure 8:
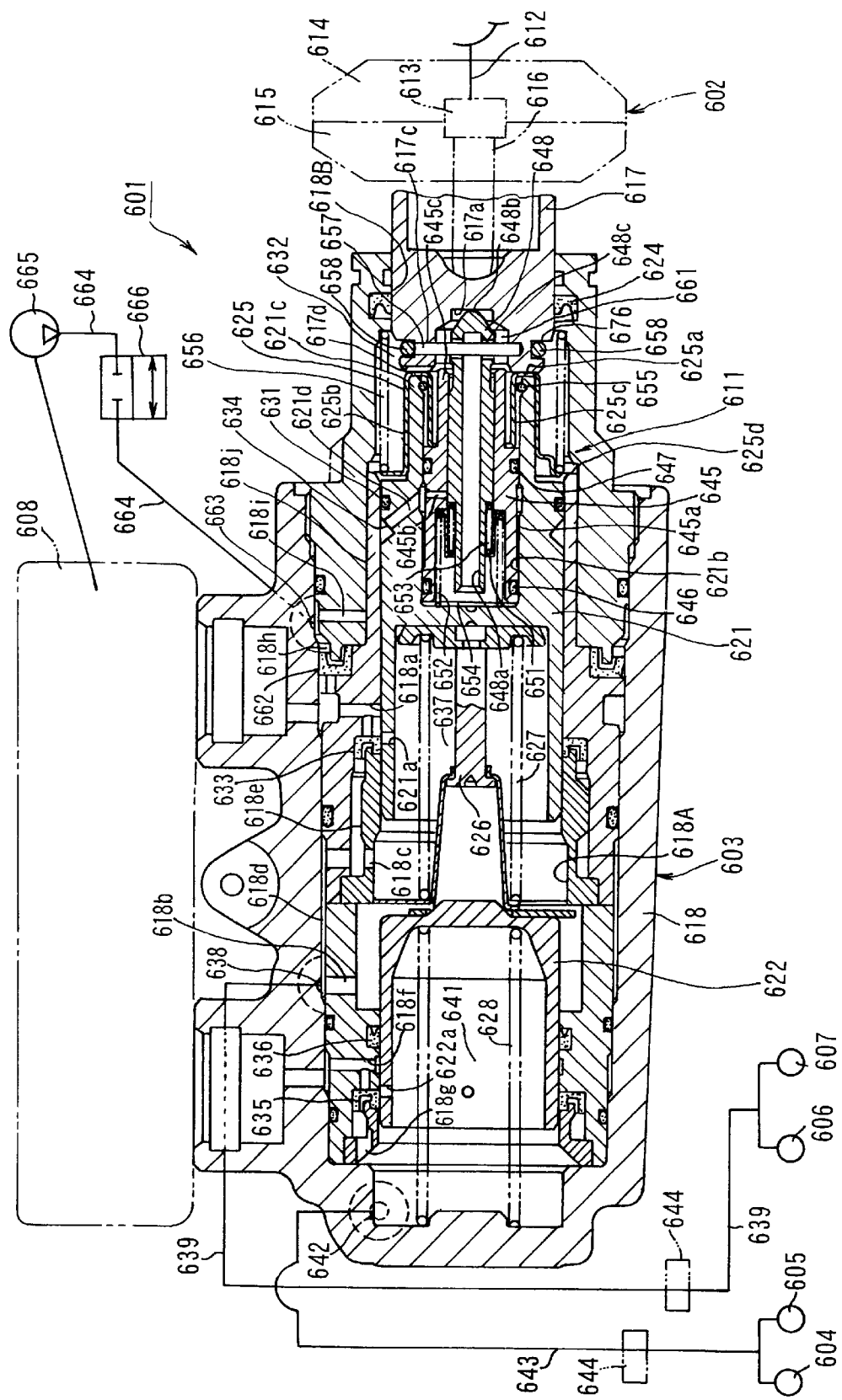
FIG. 8 is a cross section of a seventh embodiment of the invention.
Figure 9:
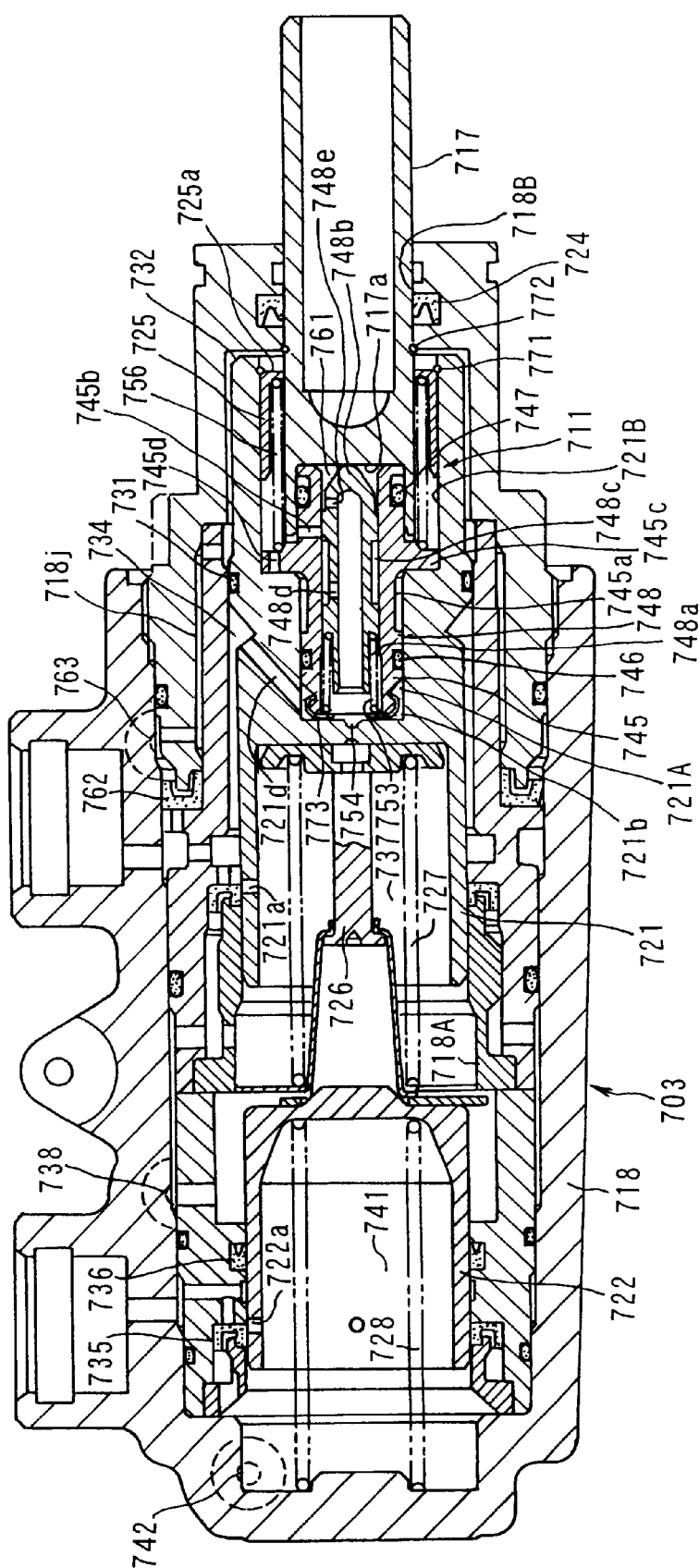
FIG. 9 is a cross section of an eighth embodiment of the invention.

FIGS. 8 and 9 show a seventh and an eighth embodiment of the invention, respectively, where the stroke of an input shaft is made less than the stroke of the master cylinder piston when a master cylinder pressure is intensified by intensifying means.

Referring to FIG. 8, a brake system 601 according to the invention comprises a negative pressure booster 602 which delivers an output by boosting a force of depression applied to a brake pedal, a master cylinder 603 which is actuated by an output from the negative pressure booster 602 to generate a master cylinder pressure therein, wheel cylinders 604, 605, 606 and 607 which are fed with the master cylinder pressure from the master cylinder 603, a reservoir 608 of braking liquid, and intensifying means 611 disposed rearward of the master cylinder 603 for intensifying the master cylinder pressure as required.

The negative pressure booster 602 is a conventional one which is well known in the art wherein as a brake pedal is depressed, an input shaft 612 of the booster 602 is driven forward, whereby a flow path in a valve body is switched by a valve mechanism disposed in the valve body 613 to introduce the atmosphere into a variable pressure chamber 614. A resulting pressure differential between a negative pressure in a constant pressure chamber 615 and the atmospheric pressure in the variable pressure chamber 614 drives the valve body 613 forward, whereby an output at a given servo ratio is obtained from an output shaft 616. In the present embodiment, an output from the output shaft 616 is transmitted to the master cylinder 603 through an input shaft 617, which is part of the intensifying means 611.

The master cylinder 603 is of a tandem type, and includes a primary piston 621 disposed rearward in a housing 618 and a secondary piston 622 disposed forwardly in the housing 618, in the similar manner as known in the art. The housing 618 for the master cylinder 603 is formed with a larger diameter bore 618A, and a smaller diameter bore 618B which continues from the larger diameter bore 618A and extends to a rear end face thereof, both of which extend axially.

The primary piston 621 and the secondary piston 622 have their openings located forwardly, the primary piston 621 being slidably fitted into the inner periphery of the larger diameter bore 618A toward the rear end and the secondary piston 622 being slidably fitted into the inner periphery of the larger diameter bore 618A toward the front end thereof.

An input shaft 617 has a front portion which is slidably fitted into the smaller diameter bore 618B of the housing 618, and has a bottomed opening formed in its rear end in axial alignment, and the front end of an output shaft 616 of the negative pressure booster 602 is fitted into the bottomed opening to abut against the bottom of the bottomed opening. An annular seal member 624 is fitted around the inner periphery of the smaller diameter bore 618B to maintain a liquid tightness between the inner periphery of the smaller diameter bore 618B and the input shaft 617. On the other hand, the front end or end face of the input shaft 617 which is located within the larger diameter bore 618A is disposed in abutment against an annular retainer 625 to be described later, which is in turn disposed in abutment against the rear end face of the primary piston 621. Thus the retainer 625 is held sandwiched between the front end face of the input shaft 617 and the rear end face of the primary piston 621.

Accordingly, as the negative pressure booster 602 is actuated to drive the output shaft 616 forward, the input shaft 617 is driven forward or advances to cause the primary piston 621 and the secondary piston 622 to advance, thereby generating a master cylinder pressure.

An axially telescoping retainer 626 which is known in itself in the art is disposed between the rear end face of the secondary piston 622 and the opposing primary piston 621, and a spring 627 is disposed between radial portions of the retainer 626 at its front and rear ends. In this manner, in the inoperative condition shown in FIG. 8, the secondary piston 622 and the primary piston 621 are maintained in their most axially spaced conditions. A spring 628 is disposed across the front end face of the larger diameter bore 618A and the opposing secondary piston 622.

Consequently, in the inoperative condition, the secondary piston 622 and the primary piston 621 assume their inoperative positions shown where the rear end face of the primary piston 621 holds the retainer 625 sandwiched together with the front end face of the opposing input shaft 617 and thus is located rearmost within the larger diameter bore 618A. Accordingly, the input shaft 617 also assumes the rearmost inoperative position relative to the housing 618.

An annular seal member 631 is fitted around the outer periphery of the primary piston 621 toward its rear end, whereby a liquid tightness is maintained between the inner periphery of the larger diameter bore 618A and the outer periphery of the primary piston 621 at the location where the seal member 631 is fitted. In the present embodiment, the internal space within the larger diameter bore 618A, which is located rearward of the location of the seal member 631, defines an intensifying chamber 632.

An annular groove is formed in the inner periphery of the larger diameter bore 618A at an axially central position, and an annular cup seal 633 which is channel-shaped in section is fitted in the annular groove. The inner periphery of the cup seal 633 is held in close contact with the outer periphery of the primary piston 621, thus maintaining a liquid tightness thereat. The internal diameter of the inner periphery of the larger diameter bore 618A is increased in a region from a point adjacent to and rearward of the cup seal 633 to a point adjacent to and forward of the seal member 631 in the inoperative condition shown, forming an annular space between the inner periphery of the larger diameter bore 618A having its diameter increased and the outer periphery of the primary piston 621 which is located adjacent to and radially inward thereof, which defines a first annular liquid chamber 634. The first annular liquid chamber 634 communicates with the reservoir 608 through a continuing stepped radial bore 618a, whereby the braking liquid in the reservoir 608 is normally introduced into this chamber.

Toward the front end, the larger diameter bore 618A is formed with an annular groove in its inner periphery, in which an annular cup seal 635 which is channel-shaped in section is fitted. The inner periphery of the cup seal 635 is held in close contact with the outer periphery of the secondary piston 622, thus maintaining a liquid tightness thereat. The inner periphery of the larger diameter bore 618A is also formed with another annular groove at a location rearward of the cup seal 635, in which an annular seal member 636 is fitted, which is effective to maintain a liquid tightness between this annular groove and the outer periphery of the secondary piston 622.

In a region extending from the seal member 636 to the rearwardly located cup seal 633, the internal space within the larger diameter bore 618A and the internal space of the primary piston 621 which communicates therewith define together a first liquid pressure chamber 637. Radial openings 618b and 618c are formed to continue from the first liquid pressure chamber 637 and communicate with an annular opening 618d, which in turn communicates with a first output port 638, which in turn communicates with the rear wheel cylinders 606 and 607 through a conduit 639.

An axial opening 618e is formed to connect between the radial openings 618c and 618a in a manner crossing the annular groove in which the cup seal 633 is fitted. The cup seal 633 is channel-shaped in section, and functions as a check valve which only permits a flow of fluid in a direction from the rear side to the front side thereof. Accordingly, the braking liquid in the reservoir 608 is introduced into the first liquid pressure chamber 637 through the radial opening 618a, the axial opening 618e, the cup seal 633 and the radial opening 618c, and thence supplied through the both radial openings 618b and 618c, the annular opening 618d and the conduit 639 into the wheel cylinders 606 and 607.

Toward the front end, the primary piston 621 is formed with a radial opening 621a which communicates with the internal space thereof, and which has an outer opening which is located in the inoperative condition shown to axially straddle the rear end face of the cup seal 633 and remains at rest at this position. A radial clearance is normally maintained between the rear end face of the cup seal 633 and the rear end face of the annular groove in which it is fitted. Accordingly, a communication is normally maintained between the reservoir 608 and first liquid pressure chamber 637 through the radial opening 621a, a space located adjacent to and rearward of the cup seal 633 and the rearwardly located axial opening 618e and radial opening 618a, whereby the braking liquid of an atmospheric pressure is supplied into the first liquid pressure chamber 637.

A second liquid pressure chamber 641 is defined by the internal space of the larger diameter bore 618A in a region located forwardly of the cup seal 635 and the internal space of the secondary piston 622 which communicates therewith. The second liquid pressure chamber 641 is maintained in communication with the front wheel cylinders 604 and 605 through a second output port 642 and a conduit 643 connected thereto.

A radial opening 618f which communicates with the reservoir 608 is formed between the cup seal 635 and the seal member 636. An axial opening 618g which continues to the radial opening 618f is formed in crossing relationship with the annular groove in which the cup seal 635 is fitted, and has a front end which is maintained in communication with the second liquid pressure chamber 641. The cup seal 635 is channel-shaped in section, and functions as a check valve which only permits a flow of braking liquid in a direction from the rear side to the front side thereof. Accordingly, the braking liquid in the reservoir 608 is introduced into the second liquid pressure chamber 641 through the radial opening 618f, the axial opening 618g and the cup seal 635, and is thence supplied to the wheel cylinders 604 and 605 through the conduit 643.

Toward the front end, the secondary piston 622 is formed with a radial opening 622a which communicates with the internal space thereof, and which has an outer opening which comes to a stop at a location axially straddling the rear end face of the cup seal 635 in the inoperative condition shown. A radial clearance is maintained between the rear end face of the cup seal 635 and the end face of the annular groove in which it is fitted. Accordingly, in the inoperative condition shown, a communication is established between the reservoir 608 and the second liquid pressure chamber 641 through the radial opening 622a, a space communicating therewith and located rearward of the cup seal 635 and the rearwardly located axial opening 618g and radial opening 618f, and thus the braking liquid of an atmospheric pressure is supplied into the second liquid pressure chamber 641.

As contrasted to the inoperative condition shown, in the operative condition where the primary piston 621 and the secondary piston 622 advance, the radial opening 621a in the primary piston 621 moves forwardly of the cup seal 633 and the radial opening 622a in the secondary piston 622 moves forwardly of the cup seal 635. As a consequence, the inner periphery of the cup seal 633 is held in close contact with the outer periphery of the primary piston 621 at a location rearward of the radial opening 621a to interrupt the communication between the first liquid pressure chamber 637 and the reservoir 608, and the inner periphery of the cup seal 635 is held in close contact with the outer periphery of the secondary piston 622 at a location rearward of the radial opening 622a to interrupt the communication between the second liquid pressure chamber 641 and the reservoir 608. In this manner, a master cylinder pressure is generated within the first liquid pressure chamber 637 and the second liquid pressure chamber 641, and is supplied through the conduits 639 and 643 to the wheel cylinders 604 to 607, thus producing a braking effort. In the present embodiment, liquid pressure control means 644 which are known to provide an antiskid control are disposed in the conduits 639 and 643. By controlling the operation of the liquid pressure control means 644 using a controller, not shown, it is possible to provide the antiskid control.

In the present embodiment, intensifying means 611 is disposed rearward of the primary piston 621, and can be used to cause the primary piston 621 and the secondary piston 622 to advance as required to intensify the master cylinder pressure.

Specifically, the rear end face of the primary piston 621 is formed with an axial bottomed opening 621b in axial alignment, and toward the rear end, the outer periphery of the primary piston 621 is provided as a reduced diameter portion 621c which is reduced in diameter as compared with a portion thereof located forward of the seal member 631.

A cylindrical sleeve 645 is slidably fitted into the bottomed opening 621b.

A pair of annular seal members 646 and 647 are fitted in the outer periphery of the sleeve 645 toward the front end and at the central portion thereof to maintain a liquid tightness between the outer periphery of the sleeve 645 and the inner periphery of the bottomed opening 621b in the regions of the seal members 646, 647.

A radial opening 645a is formed in the outer periphery of the sleeve 645 between the locations of the annular seal members 646 and 647, and continues to a radial opening 645b which opens into the internal space.

At a location forward of the seal member 631, the primary piston 621 is formed with a passage 621d which comprises an annular groove and a radial opening, and the first annular liquid chamber 634 and the annular groove 645a in the sleeve 645 are maintained in communication through the passage 621d. In other words, a communication is normally maintained between the reservoir 608 and the radial opening 645b in the sleeve 645 through the first annular liquid chamber 634.

The sleeve 645 has an axial size which is chosen to be substantially equal to the depth of the bottomed opening 621b formed in the primary piston 621, and the rear end of the sleeve 645 is located adjacent to the intensifying chamber 632. Toward its rear end, the outer periphery of the sleeve 645 has its diameter reduced as compared with its forward portion to provide a reduced diameter portion 645c while the inner periphery of the sleeve 645 has an increased diameter toward the front end and a reduced diameter toward the rear end. A spool valve 648 in the form of a bottomed cylinder is slidably fitted into the inner periphery of the sleeve 645 having a reduced diameter which is located toward the rear end.

The spool valve 648 is slidably fitted into the sleeve 645 with its opening disposed foremost, and in the front portion where the opening is provided, the outer periphery of the spool valve 648 is reduced in diameter than the outer periphery of the rear portion thereof to provide a reduced diameter portion 648a. The spool valve 648 has an axial size which is greater than the axial size of the sleeve 645, and has a rear end 648b which is sharpened into a conical form. Toward the rear end 648b, the spool valve 648 is formed with a radial through-opening 648c.

A cylindrical retainer 651 is disposed inside the front portion of the sleeve 645 in surrounding relationship with the reduced diameter portion 648a of the spool valve 648, and has a rear flange which is disposed in abutment against the stepped end face of the sleeve 645. A spring 652 is disposed between the rear flange of the retainer 651 and the bottom of the bottomed opening 621b of the opposing primary piston 621, and the resilience of the spring 652 normally urges the sleeve 645 rearward relative to the bottomed opening 621b of the primary piston 621.

A spring 653 is disposed between a front radial portion of the retainer 651 and the opposing stepped end face of the spool valve 648 and normally urges the spool valve 648 rearward. The resilience of the spring 653 is chosen to be less than the resilience of the outer spring 652.

A reaction chamber 654 is defined by a space which is surrounded by the bottom of the bottomed opening 621*b* and a portion of the inner periphery of the sleeve 645 which is located adjacent to and rearward thereof. The reaction chamber 654 is maintained in communication with the internal space of the spool valve 648. In the inoperative condition shown, the radial opening 645*b* in the sleeve 645 is closed by the outer periphery of the spool valve 648 which is located rearward of the stepped end face.

Considering the retainer 625, it is generally annular in configuration, and includes a radial portion 625*a* at its rear end and an outer and an inner sleeve portion 625*b* and 625*c* which extend forwardly from the outer and the inner edge of the radial portion 625*a*. It also includes a flange 625*d* which extends radially outward at a location corresponding to the front end of the outer sleeve portion 625*b*.

The outer sleeve portion 625*b* of the sleeve 625 is slidably fitted around the outer periphery of the sleeve 645 at its rear end (reduced diameter portion 621*c*) while loosely fitting the inner sleeve portion 625*c* inside the reduced diameter portion 621*c* of the sleeve 645, the fitting taking place from the rear side. The front end of the inner sleeve portion 625*c* abuts against the rearwardly facing stepped end face of the sleeve 645. An annular seal member 665 is mounted around the reduced diameter portion 621*c* of the primary piston 621 toward its rear end, thereby maintaining a liquid tightness between the reduced diameter portion 621*c* of the primary piston 621 around the inner periphery thereof and the outer periphery of the inner sleeve portion 625*c* of the retainer 625.

A spring 656 is disposed between the flange 625*d* of the retainer 625 and the opposing stepped end face of the larger diameter bore 618A, and accordingly, the retainer 625 is fitted into the reduced diameter portion 621*c* of the primary piston 621 until its radial portion 625*a* abuts against the front end face of the primary piston 621. At this position, the radial portion 625*a* of the retainer 625 abuts against the front end face of the input shaft 617. The resilience of the spring 656 is less than the springs 627 and 628, but is greater than the resilience of the spring 652 which is disposed inside the sleeve 645.

The front end face of the input shaft 617 is formed with a stepped bottomed opening 617*a* having a decreasing diameter in a rearward direction in axial alignment. The outer periphery of the input shaft 617 which is disposed within the intensifying chamber 632 has a reduced diameter, where it is formed with an annular groove continuing to a radial opening 617*c*.

The rear end (tip 648*b*) of the spool valve 648 projecting rearward beyond the rear end of the sleeve 645 is inserted into the bottomed opening 617*a* in the input shaft 617, with the tip 648*b* abutting against the bottom of the bottomed opening 617*a*. A pin 657 which is fitted into the radial opening 617*c* in the input shaft 617 extends through the radial opening 648*c* formed in spool valve 648, with an annular lock ring 658 engaged with the annular groove 617*b* formed in the input shaft 61, thus connecting the input shaft 617 and the spool valve 648 together.

A space 661 is formed between the bottomed opening 617*a* in the input shaft 617 and the outer periphery of the spool valve 648 which is disposed therein, and is maintained in communication with the intensifying chamber 632 through a notch 617*d* formed in the front end face of the input shaft 617.

The space 661 is also maintained in communication with the reaction chamber 654 through the radial opening 648*c* and the internal space of the spool valve 648, and accordingly, the communication is normally maintained between the intensifying chamber 632 and the reaction chamber 654 through the notch 617*d*, the space 661, the radial opening 648 and the internal space of the spool valve 648.

In the inoperative condition shown, the inner end of the radial opening 645*b* formed in the sleeve 645 is closed by the outer periphery of the spool valve 648 which is disposed adjacent to and rearward of the spring 653. Accordingly, the communication between the reservoir 608 and the reaction chamber 654 and the intensifying chamber 632 which is established through the radial opening 645*b* in the sleeve 645, the passage 621*d* in the primary piston 621, the first annular liquid chamber 634 and the radial opening 618*a* is interrupted.

As will be further discussed later, the present embodiment is constructed so that a relative movement is permitted in the axial direction between the spool valve 648 and the sleeve 645, which form together a valve mechanism, on one hand and the primary piston 621, and at this end, an arrangement is made to allow the advancing stroke of the input shaft 617 to be reduced than the advancing stroke of the primary piston 621 as the intensifying means 611 is actuated.

The housing 618 is formed, in its rear portion, with an axial opening 618*h* which continues from the radial opening 618*a* in the rearward direction, and a radial opening 618*i* continues from the rear end of the axial opening 618*h* to extend in a radial direction. The radial opening 618*i* continues to an annular opening 618*j*, and the rear end of the annular opening 618*j* opens into the larger diameter bore 618A so as to communicate with the intensifying chamber 632.

An annular groove is formed in a manner crossing the axial opening 618*h*, and a cup seal 662 which is C-shaped in section is fitted in the annular groove. The cup seal 662 functions as a check valve which only permits a flow of braking liquid in a direction from the front side to the rear side thereof Accordingly, the braking liquid in the reservoir 608 is supplied into the intensifying chamber 632 through the radial opening 618*a*, the axial opening 618*h*, the cup seal 662, the radial opening 618*i* and the annular opening 618*j*. By contrast, the braking liquid in the intensifying chamber 632 can not be returned to the reservoir 608 through the path mentioned immediately above. As mentioned above, the intensifying chamber 632 can be brought into communication with the reaction chamber 654 normally through a flow path including the internal space of the spool valve 648, whereby the braking liquid introduced into the intensifying chamber 632 can also be introduced into the reaction chamber 654.

The housing 618 is formed with a communication opening 663 which continues from the radial opening 618*i*, and which communicates through a conduit 664 to a pump 665. A normally closed solenoid operated valve 666 is disposed in the conduit 664.

The operation of the solenoid valve 666 and the pump 665 is controlled by a controller, not shown, which is designed to operate the pump 665 and the solenoid valve 666 as required.

Under the condition shown in FIG. 8 in which the radial opening 645*b* in the sleeve 645 is closed by the outer periphery of the spool valve 648 or the reaction chamber 654 is not in communication with the reservoir 608, as the controller operates the pump 665 and opens the solenoid valve 666, a discharge pressure from the pump 665 is supplied to the intensifying chamber 632 and the reaction chamber 654. As the discharge pressure from the pump 665 is supplied to the intensifying chamber 632, the primary piston 621 and the secondary piston 622 are caused to advance, whereupon the master cylinder pressure in the first liquid pressure chamber 637 and the second liquid pressure chamber 641 is intensified.

It will be appreciated from the forgoing description that the intensifying means 611 of the present embodiment comprises the intensifying chamber 632, the reaction chamber 654, the pump 665, flow paths for providing communication of the braking liquid between these components, the sleeve 645, the spool valve 648, the retainer 625, the springs 652, 653, 656, the solenoid valve 666 and the input shaft 617.

Operation

With the described arrangement, in the inoperative condition where a brake pedal is not repressed, the components of the brake system 601 assume their inoperative positions shown in FIG. 8. Under this condition, the pump 665 is not operated, and the solenoid valve 666 remains closed. The primary piston 621 and the secondary piston 622 which are urged by the springs 627 and 628 are maintained in their rearmost retracted positions, with the end face of the primary piston 621 abutting against the radial portion 625a of the retainer 625, which in turn abuts against the front end face of the input shaft 617.

Since the spool valve 648 is urged rearward by the spring 653, the front end of the spool 648 is spaced from the bottom of the bottomed opening 621b of the primary piston 621 while the tip 648b of the spool valve 648 abuts against the bottom of the bottomed opening 617a formed in the input shaft 617.

The sleeve 645 which is urged rearward by the spring 652 has its stepped end face disposed in abutment against the end of the inner sleeve 625c of the retainer 625, and thus is located foremost in the bottomed opening 621b.

Since the braking liquid is designed to be supplied from the reservoir 608 to the intensifying chamber 632 through a flow path including the rear cup seal 662, both the intensifying chamber 632 and the reaction chamber 654 assume an atmospheric pressure. The radial opening 645b of the sleeve 645 is closed by the outer periphery of the spool valve 648, and accordingly, the communication between the reaction chamber 654 and the reservoir 608 through the radial opening 645b of the sleeve 645 is interrupted. The first liquid pressure chamber 637 and the second liquid pressure chamber 641 of the master cylinder 603 communicate with the reservoir 608 and thus assume an atmospheric pressure.

Normal Brake Operation

When a brake pedal is gently depressed under the inoperative condition, the negative pressure booster 602 is actuated, driving the output shaft 616 forward. In response thereto, the input shaft 617 is driven forward, causing the retainer 625, the sleeve 645, the spool valve 648, the primary piston 621 and the secondary piston 622 to advance under the influence of the output from the output shaft 616 while maintaining the conditions shown in FIG. 8.

Consequently, the radial opening 621a in the primary piston 621 moves forwardly of the cup seal 633 and the radial opening 622a in the secondary piston 622 moves forwardly of the cup seal 635. Consequently, the communication between the first liquid pressure chamber 637 and the reservoir 608 is interrupted, and the communication between the second liquid pressure chamber 641 and the reservoir 608 is interrupted. In this manner, a master cylinder pressure is generated in the first liquid pressure chamber 637 and the second liquid pressure chamber 641, and is supplied to the wheel cylinders 604, 605, 6 and 607, thus obtaining a braking effort in a usual manner.

As the primary piston 621 advances, the volume of the intensifying chamber 632 increases, and accordingly, the intensifying chamber 632 tends to assume a negative pressure, but because the braking liquid from the reservoir 608 is fed through the flow path including the cup seal 662 to replenish the intensifying chamber 632, the atmospheric pressure is maintained within the intensifying chamber 632. Accordingly, it is possible to allow the primary piston 621 to advance smoothly.

Subsequently, as the brake pedal is released, the negative pressure booster 602 becomes deactuated, and the output shaft 616 and the input shaft 617 retract rearwardly to their inoperative positions.

At the time when the output shaft 616 and the input shaft 617 begin to retract, both the reaction chamber 654 and the intensifying chamber 632 are isolated from the reservoir 608 and are sealed, and accordingly, the primary piston 621 and the secondary piston 622 do not retract.

Subsequently, as the output shaft 616 and the input shaft 617 further retract, the front end face of the input shaft 617 becomes spaced from the retainer 625. This brings a front portion of the spool valve 648 having a reduced diameter to the location of the inner end of the radial opening 645b, whereby the reaction chamber 654 communicates with the reservoir 608 through the path including the radial opening 645b. Consequently, both the primary piston 621 and the secondary piston 622 retract rearwardly while displacing the braking liquid in the reaction chamber 654 and the intensifying chamber 632 to the reservoir 608. Accordingly, the braking effort produced by the respective wheel cylinder 604 to 607 is reduced. When each of the pistons 621 and 622 retracts to the inoperative position shown, both the first liquid pressure chamber 637 and the second liquid pressure chamber 641 communicate with the reservoir 608 to assume an atmospheric pressure, whereby the brake system 601 assumes the inoperative condition shown, thus releasing the brake.

An input/output characteristic of the master cylinder 603 during the normal brake operation mentioned above can be represented by the following equation:

$$P = F/A - SPG1/A \tag{1}$$

where P represents a master cylinder pressure, F represents an output from the negative pressure booster 602 acting upon the input shaft 617, A represents a cross-sectional area of the master cylinder piston (assuming that both the primary piston 621 and the secondary piston 622 have an equal cross-sectional area) and SPG1 represents the resilience of the rear spring 627, and which equation is derived from the equilibrium of the primary piston 621.

Brake Assisting Operation

The present embodiment utilizes a controller, not shown, as mentioned above, and in addition uses detection means for detecting the rising rates of a force of depression applied to a brake pedal, a pedal stroke and the like. Such detection means is arranged to supply the rising rates of the force of depression applied to the brake pedal or the pedal stroke to the controller. If the controller determines that the rising rates of the force of depression applied to the brake pedal and the pedal stroke are higher than those which prevail during a normal brake operation to require a brake assisting operation such as applying a quick brake operation on the basis of results of detection which are transmitted from the detection means, it operates the pump 665 and opens the solenoid valve 666.

Thereupon, the pump 665 feeds the braking liquid to the intensifying chamber 632 through the conduit 664, the radial path 618*i* and the annular opening 618*j*. When the braking liquid is fed from the pump 665 to the intensifying chamber 632, a pressure rise is allowed in the intensifying chamber 632 and the reaction chamber 654 to the discharge pressure of the pump 665.

The liquid pressure which prevails in the intensifying chamber 632 drives the input shaft 617 rearward and when such drive exceeds the input acting on the input shaft 617, the latter retracts rearwardly, whereby the spool valve 648 moves rearwardly to allow a communication between the reaction chamber 654 and the radial opening 645*a*, thus discharging the liquid pressure from the intensifying chamber 632 into the reservoir 608. Thus, the discharge pressure of the pump 665 which is applied to the intensifying chamber 632 is controlled in accordance with the input applied to the input shaft 617.

The discharge pressure from the pump 665 which prevails in the intensifying chamber 632 and the reaction chamber 654 causes the primary piston 621 and the secondary piston 622 to advance. Since the primary piston 621 advances relative to the sleeve 645, the retainer 625, the spool valve 648 and the input shaft 617, the resilience of the spring 652 is decreased by an amount corresponding to the relative movement, which causes the retainer 625 and the sleeve 645 to advance relative to the spool valve 648 and the input shaft 617 under the resilience of the spring 656. Concomitantly, the resilience of the spring 656 is decreased also, and the sleeve 645 is maintained at a location where the resiliences of the springs 652 and 656 are balanced.

The stroke L2 by which the sleeve 645 has advanced from its inoperative condition to this point is less than the stroke L1 by which the primary piston 621 has advanced from its inoperative condition to this point. In other words, during the brake assisting operation, the advancing stroke of the input shaft 617 can be reduced as compared the advancing stroke which occurs during the normal braking operation. Thus, the stroke by which a brake pedal is depressed can be reduced during the brake assisting operation than during the normal brake operation.

Accordingly, the input/output characteristic of the master cylinder 603 during the brake assisting operation can be derived from the equilibrium of the input shaft 617 as represented by the following equation:

$$P=F/B-SPG2/B \qquad (2)$$

where P represents a master cylinder pressure or pump discharge pressure, F an input applied to the input shaft 17 or an output from the negative pressure booster 602, B a cross-sectional area of the input shaft 617 at the location of the smaller diameter bore 618B, and SPG2 the resilience of the spring 653.

Comparing the equation (2) with the equation (1) which applies for the normal brake operation, it will be seen that the servo ratio is greater during the brake assisting operation than for the normal brake operation because B<A. Accordingly, it is seen that with the brake system 601 of the present embodiment, a brake assisting operation can be reliably performed.

During the brake assisting operation, if the brake pedal is subsequently released, a signal from the detection means causes the controller to deactivate the pump 655 and to close the solenoid valve 666.

Subsequently, in the similar manner as when the normal brake operation is released, the output shaft 616 and the input shaft 617 retract initially, followed by a retracting movement of the spool valve 648 to establish a communication between the radial opening 645*b* of the sleeve 645 and the reaction chamber 654. This allows both the intensifying chamber 632 and the reaction chamber 654 to communicate with the reservoir 608, whereby the primary piston 621 and the secondary piston 622 retract, the rear end of the primary piston 621 abuts against the radial portion 625*a* of the retainer 625, and the negative pressure booster 602 and the master cylinder 603 return to their inoperative conditions shown, releasing the brake.

Negative Pressure Default

Although not shown, a negative pressure sensor is provided in the present embodiment, and in the event the source of the negative pressure falls below a given value as by default, the sensor notifies the controller to this effect.

If a detection signal notifying a negative pressure default is transmitted from the negative pressure sensor during the normal brake operation, the controller operates the pump 665 and opens the solenoid valve 666 to feed the discharge pressure from the pump 665 to the intensifying chamber 632. This intensifies the master cylinder pressure to allow a braking effort of an increased magnitude to be obtained if the negative pressure from the source of negative pressure falls below a given value and the output from the negative pressure booster 602 decreases correspondingly.

When during the normal brake operation, the master cylinder pressure rises with a usual servo ratio relative to the force of depression applied to the brake pedal (or input), it is possible to achieve a reverse dual servo ratio characteristic in which the master cylinder pressure rises with a servo ratio greater than a usual servo ratio for an input equal to or greater than a given value, as shown in FIG. 2. Specifically, there may be provided a pedal stroke sensor which detects the depression stroke of the brake pedal, a depression force sensor which detects the force of depressing the brake pedal, a pressure sensor which detects a master cylinder pressure or any other sensor, not shown, which detects a desired input so that during the normal brake operation which takes place at a usual servo ratio, any input detection signal or signals supplied from the described sensors may be used to open the solenoid valve 666 and to operate the pump 665 in the similar manner as mentioned above in connection with the brake assisting operation, whenever the controller detects an input in excess of a given value representing a break point in the servo ratio. Thereupon, the servo ratio is changed from the usual servo ratio represented by the equation (1) to a greater servo ratio represented by the equation (2), in the manner illustrated in FIG. 2. In this manner, a braking effort of a greater magnitude can be obtained for an input in excess of a given value.

Recently the negative pressure tends to decrease as a result of reducing the fuel cost of the engine for automobiles, but the described reverse dual servo ratio characteristic allows a greater master cylinder pressure to be obtained, assuring that a greater braking effort can be obtained if the negative pressure is decreased.

Eighth Embodiment

FIG. 9 shows an eighth embodiment of the invention in which a primary piston 721 has a bottomed opening 721*b* which is stepped, and in a corresponding manner, a sleeve 745 is in the form of a stepped cylinder having a greater diameter in its rear portion.

Specifically, the bottomed opening 721*b* of the primary piston 721 includes a forwardly located smaller diameter bore 721A and a rearwardly located greater diameter bore 721B. A reaction chamber 754 is defined within the smaller diameter bore 721A, and communicates with the reservoir through a radial passage 721*d* in the primary piston 721, a first annular liquid chamber 734 or the like, whereby the reaction chamber 754 assumes an atmospheric pressure.

Toward the axial center, the sleeve 745 is formed with a flange 745c of an increased diameter, which is slidably fitted into the greater diameter bore 721B of the primary piston 721 while the outer periphery thereof which is located forwardly of the flange 745c is slidably fitted into the smaller diameter bore 721A of the primary piston 721. An annular groove 745a is formed in the outer periphery at a location adjacent to and forwardly of the flange 745c, and a seal member 746 is fitted in the outer periphery at a location forwardly of the annular groove 745a, thereby maintaining a liquid tightness between the inner periphery of the smaller diameter bore 721A of the primary piston 721 and the outer periphery of the sleeve 745 at a location forward of the annular groove 745a.

An axial opening 745d extends through the flange 745c, thereby allowing the braking liquid which is fed into an intensifying chamber 732 to be introduced to the location of the annular groove 745a which is disposed forwardly of the flange 745c.

A radial opening 745b is formed in the sleeve 745 at a location rearward of the flange 754c, thereby allowing a communication between the inside and the outside of the sleeve 745.

In the eighth embodiment, a retainer 725 is cylindrical, and is fitted into the greater diameter bore 721B of the primary piston 721. A stop ring 771 is detented to a rear portion of the greater diameter bore 721B, and the retainer 725 is positioned so that its rear end abuts against a stop ring 771.

A spring 756 is disposed between a radial portion 725a of the retainer 725 and the opposing flange 745c of the sleeve 745, whereby the sleeve 745 is positioned so that the flange 745c abuts against a stepped end face of the greater diameter bore 721B.

On the other hand, an input shaft 717 has a bottomed opening 717a having an axially uniform internal diameter, into which the outer periphery of the sleeve 645 is slidably fitted toward its rear end. Toward the rear end, the outer periphery of the sleeve 745 has a seal member 747 fitted therein, thereby maintaining a liquid tightness between the outer periphery of the sleeve 745 toward its rear end and the bottomed opening 717a formed in the input shaft 717.

A stop ring 772 is fitted in the input shaft 717 at an axial position which is located adjacent to the intensifying chamber 732, thus restricting the end position to which the input shaft 717 can retract relative to a housing 718.

Toward the rear end, the external diameter of the sleeve 745 which is fitted into the bottomed opening 717a of the input shaft 717 is greater than the external diameter of a forward portion of the sleeve 745 which is fitted into the smaller diameter bore 721A of the primary piston 721.

An annular groove 748c is formed in the outer periphery of the spool valve 748 toward its axial center, and continues to a radial opening 748d. The spool valve 748 is formed with a radial opening 748e at a location adjacent to its tip 748b. A communication is maintained between a space 761 within the bottomed opening 717a of the input shaft 717 and a reaction chamber 754 through the radial opening 748e and the internal space of the spool valve 748. Also in the eighth embodiment, in the inoperative condition shown, the radial opening 745b of the sleeve 745 is closed by the outer periphery of the spool valve 748.

An annular retainer 773 is fitted into the front end of the sleeve 745 at a location adjacent to the reaction chamber 754, and a spring 753 is disposed between the retainer 773 and an opposing stepped end face of the spool valve 748, thus urging the spool valve 748 rearward so that its tip 748b abuts against the bottom of the bottomed opening 717a of the input shaft 717. Thus, in the eighth embodiment, the input shaft 717 and the spool valve 748 are not connected together by a pin, but are in abutting relationship through the spring 753 alone. In this connection, the input shaft 717 has an external diameter which is axially uniform.

In other respects, the arrangement is similar to that of the seventh embodiment mentioned above.

Operation

With the eighth embodiment constructed in the manner mentioned above, when a brake pedal is depressed in the inoperative condition shown to cause the input shaft 717 to be driven forward in response to an output from a negative pressure booster, the sleeve 745, the primary piston 721 and a secondary piston 722 are driven forward together with the input shaft 717. In this manner, a master cylinder pressure can be generated in both liquid pressure chambers 737 and 741 to obtain a usual braking effort, in the similar manner as described above in connection with the seventh embodiment.

In contrast to the normal braking operation mentioned above, during the brake assisting operation, as a brake pedal is rapidly depressed in the inoperative condition shown, the input shaft is driven forward in response to an output from the negative pressure booster. In addition, a controller causes the discharge pressure from the pump to be fed to the intensifying chamber 732.

Thereupon the primary piston 721 and the secondary piston 722 advance through the greater diameter bore 718A while advancing relative to the sleeve 745. The discharge pressure of the pump which is fed into the intensifying chamber 732 acts upon a front portion of the input shaft 717 which is disposed outside the bottomed opening 717a in the rearward direction, and when such an action exceeds an input acting upon the input shaft 717, the input shaft 717 retracts rearwardly, accompanying a retracting movement of the spool valve 748. As a consequence, a communication is established between the annular groove 748c in the spool valve 748 and a radial opening 745b in the sleeve 745, whereby the liquid pressure in the intensifying chamber 732 is displaced to the reservoir through the radial opening 745b, the annular groove 748c, the radial opening 748d and the reaction chamber 754, thus controlling the discharge pressure from the pump which is fed to the intensifying chamber 732 in accordance with the input acting upon the input shaft 717.

At this time, the liquid pressure within the intensifying chamber 732 urges the sleeve 745 rearward with a force corresponding to a difference in the cross-sectional area between a front portion of the sleeve which is fitted into the smaller diameter bore 721A and the rear portion thereof which is fitted around the bottomed opening 717a. The force which urges the sleeve 745 rearward is balanced with the resilience of the spring 756. In this manner, an arrangement is made to permit a relative movement between the primary piston 721 and the sleeve 745, and the relative positions of the sleeve 745 and the primary piston 721 can be controlled in accordance with the liquid pressure in the intensifying chamber 732 which acts upon the sleeve 745. As a consequence of this, the stroke L2 by which the sleeve 745 advances from its inoperative condition to this point is reduced than the stroke L1 by which the primary piston 721 advances from its inoperative condition to this point. In other words, during the brake assisting operation, the advancing stroke of the input shaft 717 can be reduced by an amount corresponding to L1–L2 as compared with the advancing stroke which prevails during the normal brake operation.

In this manner, the eighth embodiment is capable of achieving similar functions and effects as in the seventh embodiment.

The seventh and the eighth embodiment are illustrations of applying the present invention to a control valve mechanism of a so-called closed center type in which in the inoperative condition, the radial opening 645b (745b) of the sleeve 645 (745) is closed by the spool valve 648 (748) while in the operative condition, the radial opening 645b (745b) is opened and the channel from the intensifying chamber 632 (732) to the reservoir 608 is restricted to control the liquid pressure in the intensifying chamber 632 (732), but the present invention is also applicable to a control valve mechanism of a so-called open center type in which in the inoperative condition, the radial opening 645b (745b) of the sleeve 645 (745) is allowed to communicate with the reaction chamber 654 (754) while in the inoperative condition, the radial opening 645b (745b) is restricted to control the liquid pressure in the intensifying chamber 632 (732).

It should be understood that in the seventh and the eighth embodiment, the brake system includes a negative pressure booster 602, but the present invention is also applicable to a brake system which is not provided with a booster, but in which a brake pedal directly acts on the input shaft 617 (717) of the master cylinder 603.

Ninth Embodiment

Figure 10:
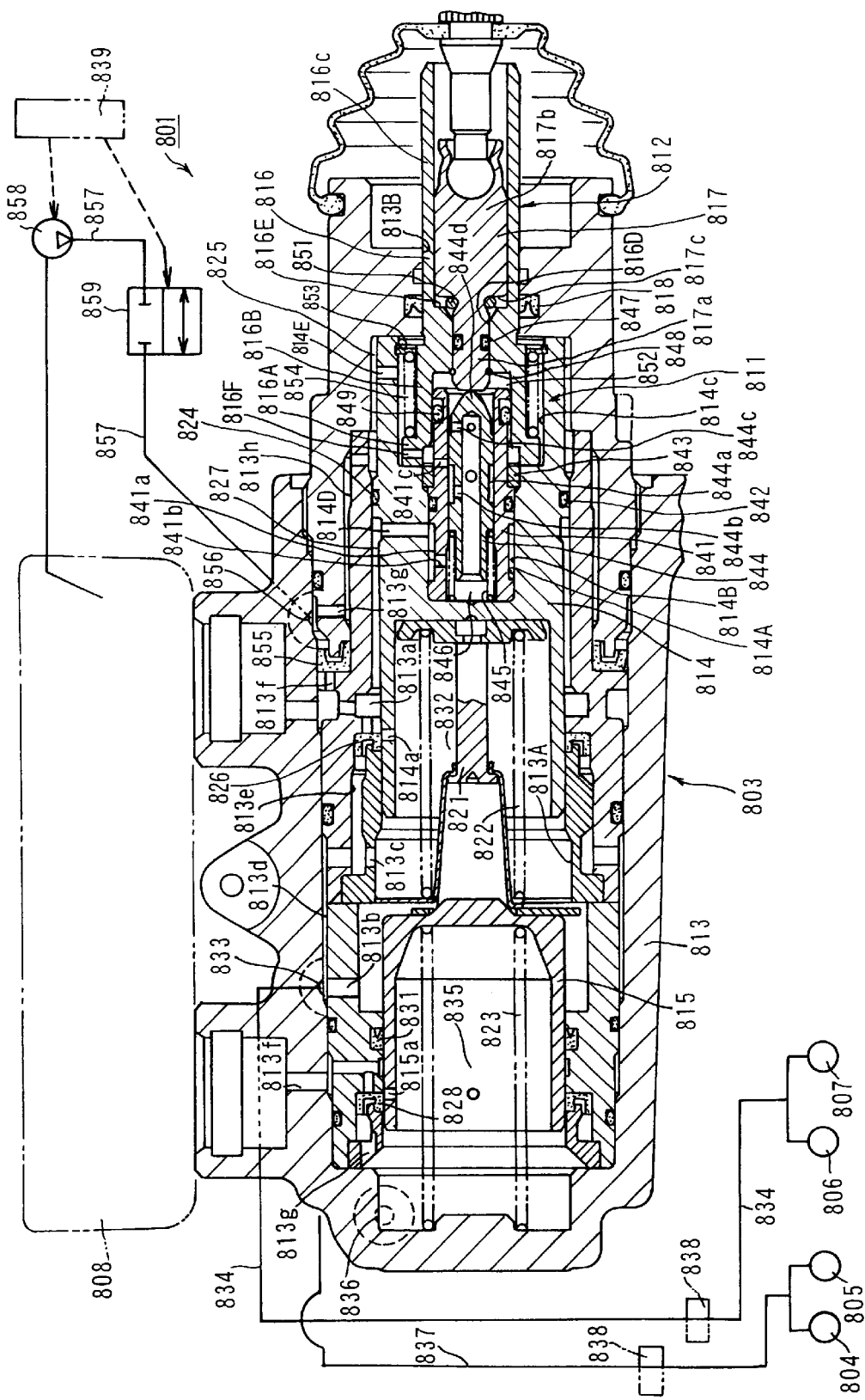
FIG. 10 is a cross section of a ninth embodiment of the invention.

FIG. 10 shows a ninth embodiment of the invention in which the gradient of intensification at the commencement of intensifying a master cylinder pressure by means of intensifying means can be increased.

Referring to FIG. 10, a brake system 801 according to the invention comprises a master cylinder 803 which is operated by a brake pedal, not shown, to generate a master cylinder pressure, wheel cylinders 804 to 807 which are fed with the master cylinder pressure from the master cylinder 803, a reservoir 808 of braking liquid, and intensifying means 811 disposed rearward of the master cylinder 803 for intensifying the master cylinder pressure as required.

The master cylinder 803 is of a tandem type, and includes a primary piston 814 located rearwardly within a housing 813 and a secondary piston 815 located forwardly within the housing 813, in the similar manner as known in the art. The housing 813 of the master cylinder 803 is formed with a larger diameter bore 813A, and a smaller diameter bore 813B which continues from the larger diameter bore 813A and extends to a rear end face thereof, both of which extend axially.

The primary piston 814 is slidably fitted into the inner periphery of the larger diameter bore 813A toward the rear end and the secondary piston 815 is slidably fitted into the inner periphery of the larger diameter bore 813A toward the front end thereof.

As will be described in detail later, an input shaft 812 comprises a reaction piston 816 in the form of a stepped cylinder, and an input plunger 817 which is slidably fitted into the inner periphery of the reaction piston 816 in a manner maintaining a liquid tightness. The reaction piston 816 extends slidably through the reduced diameter bore 813B of the housing 813 and has its front end disposed within the housing 813. On the other hand, the rear end of the input plunger 817 is connected to a brake pedal, not shown. An annular seal member 818 is fitted into the inner periphery of the smaller diameter bore 813B to maintain a liquid tightness between the inner periphery of the smaller diameter bore 813B and the outer periphery of the reaction piston 816.

The front end face of the reaction piston 816 which is disposed within the larger diameter bore 813A is disposed in abutment against the primary piston 814. Accordingly, as a brake pedal is depressed to drive the input shaft 812 forward, both the primary piston 814 and the secondary piston 815 advance to generate a master cylinder pressure.

An axially telescoping retainer 821 which is known in itself in the art is disposed between the rear end face of the secondary piston 815 and the opposing primary piston 814, and a spring 822 is disposed between radial portions of the retainer 821 at its front and rear ends. A spring 823 is disposed across the front end face of the larger diameter bore 813A and the inner end of the opposing secondary piston 815.

Consequently, in the inoperative conditions shown in FIG. 10, the secondary piston 815 and the primary piston 814 assume their most axially spaced conditions where the rear end face of the primary piston 814 abuts against the stepped end face of the opposing greater diameter bore 813A and thus is located rearmost within the larger diameter bore 813A. Accordingly, the input shaft 812 also assumes the rearmost retracted position relative to the housing 813.

An annular seal member 824 is fitted around the outer periphery of the primary piston 814 toward its rear end, whereby a liquid tightness is maintained between the inner periphery of the larger diameter bore 813A and the outer periphery of the primary piston 814 at the location where the seal member 824 is fitted. In the present embodiment, the internal space within the larger diameter bore 813A, which is located rearward of the location of the seal member 824, defines an intensifying chamber 825.

An annular groove is formed in the inner periphery of the larger diameter bore 813A at an axially central position, and an annular cup seal 826 which is channel-shaped in section is fitted in the annular groove. The inner periphery of the cup seal 826 is held in close contact with the outer periphery of the primary piston 814, thus maintaining a liquid tightness thereat. The inner periphery of the larger diameter bore 813A forms, together with the outer periphery of the primary piston 814 which is disposed adjacent to and inward thereof, an annular groove, in a region from a point adjacent to and rearward of the cup seal 826 to a point adjacent to and forward of the seal member 824 in the inoperative condition, which defines a first annular liquid chamber 827. The first annular liquid chamber 827 communicates with the reservoir 808 through a continuing stepped radial bore 813a in the housing 813, whereby a braking liquid in the reservoir 808 is normally introduced into this chamber.

Toward the front end, the larger diameter bore 813A is formed with an annular groove in its inner periphery, in which an annular cup seal 828 which is channel-shaped in section is fitted. The inner periphery of the cup seal 828 is held in close contact with the outer periphery of the secondary piston 815, thus maintaining a liquid tightness thereat. The inner periphery of the larger diameter bore 813A is also formed with another annular groove at a location rearward of the cup seal 828, in which an annular seal member 831 is fitted, which is effective to maintain a liquid tightness between this annular groove and the outer periphery of the secondary piston 815.

In a region extending from the seal member 831 to the rearwardly located cup seal 826, the internal space within the larger diameter bore 813A and the internal space of the primary piston 814 which communicates therewith define together a first liquid pressure chamber 832. Radial openings 813b and 813c are formed to continue from the first liquid pressure chamber 832 and communicate with an annular opening 813d, which in turn communicates with a first output port 833, which in turn communicates with rear wheel cylinders 806 and 807 through a conduit 834.

An axial opening 813e is formed to connect between the radial openings 813c and 813a in a manner crossing the annular groove in which the cup seal 826 is fitted. The cup seal 826 is channel-shaped in section, and functions as a check valve which only permits a flow of fluid in a direction from the rear side to the front side thereof Accordingly, the braking liquid in the reservoir 808 is introduced into the first liquid pressure chamber 832 through the radial opening 813a, the axial opening 813e, the cup seal 826 and the radial opening 813c, and thence supplied through the both radial openings 813b and 813c, the annular opening 813d and the conduit 834 into the wheel cylinders 806 and 807.

Toward the front end, the primary piston 814 is formed with a radial opening 814a which communicates with the internal space thereof, and which has an outer opening which is located in the inoperative condition shown to axially straddle the rear end face of the cup seal 826 and remains at rest at this position. A radial clearance is normally maintained between the rear end face of the cup seal 826 and the rear end face of the annular groove in which it is fitted. Accordingly, in the inoperative condition shown, a communication is normally maintained between the reservoir 808 and the first liquid pressure chamber 832 through the radial opening 814a, a space located adjacent to and rearward of the cup seal 826 and the rearwardly located axial opening 813e and radial opening 813a, and thus the braking liquid of an atmospheric pressure is introduced into the first liquid pressure chamber 832.

A second liquid pressure chamber 835 is defined by the internal space of the larger diameter bore 813A in a region located forwardly of the cup seal 828 and the internal space of the secondary piston 815 which communicates therewith. The second liquid pressure chamber 835 is always maintained in communication with the front wheel cylinders 804 and 805 through a second output port 836 and a conduit 837 connected thereto.

A radial opening 813f which communicates with the reservoir 808 is located between the cup seal 828 and the seal member 831. An axial opening 813g which continues to the radial opening 813f is formed in crossing relationship with the annular groove in which the cup seal 828 is fitted, and has a front end which is maintained in communication with the second liquid pressure chamber 835. The cup seal 828 is channel-shaped in section, and functions as a check valve which only permits a flow of braking liquid in a direction from the rear side to the front side thereof. Accordingly, the braking liquid in the reservoir 808 is introduced into the second liquid pressure chamber 835 through the radial opening 813f, the axial opening 813g and the cup seal 828, and is thence supplied to the wheel cylinders 804 and 805 through the conduit 837.

Toward the front end, the secondary piston 815 is formed with a radial opening 815a which communicates with the internal space thereof, and which has an outer opening which comes to a stop at a location axially straddling the rear end face of the cup seal 828 in the inoperative condition shown. A radial clearance is maintained between the rear end face of the cup seal 828 and the end face of the annular groove in which it is fitted. Accordingly, in the inoperative condition shown, a communication is established between the reservoir 808 and the second liquid pressure chamber 835 through the radial opening 815a, a space communicating therewith and located rearward of the cup seal 828 and the rearwardly located axial opening 813g and radial opening 813f, and thus the braking liquid of an atmospheric pressure is accumulated in the second liquid pressure chamber 835.

As contrasted to the inoperative condition shown, in the operative condition where the primary piston 814 and the secondary piston 815 advance, the radial opening 814a in the primary piston 814 moves forwardly of the cup seal 826 and the radial opening 815a in the secondary piston 815 moves forwardly of the cup seal 828. As a consequence, the inner periphery of the cup seal 826 is held in close contact with the outer periphery of the primary piston 814 at a location rearward of the opening to interrupt the communication between the first liquid pressure chamber 832 and the reservoir 808, and the inner periphery of the cup seal 828 is held in close contact with the outer periphery of the secondary piston 815 at a location rearward of the radial opening 815a to interrupt the communication between the second liquid pressure chamber 835 and the reservoir 808. In this manner, a master cylinder pressure is generated within the first liquid pressure chamber 832 and the second liquid pressure chamber 835, and is supplied through the conduits 834 and 837 to the wheel cylinders 804 to 807, thus producing a braking effort. In the present embodiment, liquid pressure control means 838 which are known to provide an antiskid control are disposed in the conduits 834 and 837. By controlling the operation of the liquid pressure control means 838 using a controller 839, it is possible to provide the antiskid control.

In the present embodiment, the intensifying means 811 is disposed rearward of the primary piston 814, and can be used to cause the primary piston 814 and the secondary piston 815 to advance as required to intensify the master cylinder pressure.

Specifically, the rear end face of the primary piston 814 is formed with an axial bottomed opening 814A in axial alignment, the opening 814A having a reduced diameter toward its front end. The bottomed opening 814A is disposed in facing relationship with the intensifying chamber 825 and the input shaft 812. The opening 814A includes a smaller diameter bore 814B forwardly and includes a larger diameter bore 814C rearwardly. Toward the rear end and within the larger diameter bore 814C, the opening is formed with a radial opening 814E which maintains a communication between the bore 814C and the chamber 825. A cylindrical sleeve 841 is disposed in the bottomed opening 814A and has its outer periphery toward the front end thereof fitted into the reduced diameter bore 814B to be secured in an integral manner therewith. A rear portion of the outer periphery of the sleeve 841 projects into the larger diameter bore 814C.

An annular seal member 842 is fitted in the outer periphery of the sleeve 841 to maintain a liquid tightness between the outer periphery of the sleeve 841 and the inner periphery of the reduced diameter bore 814B. An annular retainer 843 is fitted in the reduced diameter bore 814B toward the rear end thereof in order to prevent the sleeve 841 from becoming dislodged rearwardly from the bore 814B.

At a location forwardly of the sleeve member 824, the primary piston 814 is formed with a radial opening 814D which provides a communication between the first annular liquid chamber 827 and the smaller diameter bore 814B. Additionally, the outer periphery of the sleeve 841 is formed with an annular groove 841a which communicates with the inner end of the radial opening 814D and which continues to a radial opening 841b which opens into the inner peripheral surface. At a location adjacent to and rearward of the retainer 843, the sleeve 841 is formed with a radial opening 841c which allows a communication to be established between the internal space of the sleeve 841 and the larger diameter bore 814B of the primary piston 814.

A spool valve 844 in the form of a bottomed cylinder is slidably fitted into the sleeve 841 from the rear side. The spool valve 844 is fitted into the sleeve 841 so that its opening is located forward and a front portion of the spool valve 844 located adjacent to the opening has its outer periphery reduced in its diameter as compared with the diameter of the outer periphery at the rear end thereof. A spring 845 is disposed in surrounding relationship with the portion of the reduced diameter between the bottom of the bottomed opening 814A and the opposing stepped end face of the spool valve 844, and normally urges the spool valve 844 rearward.

An atmosphere chamber 846 is defined by a space surrounded by the bottom of the bottomed opening 814A and the inner periphery of the sleeve 841 in a region which is located adjacent to and rearward of the bottom, and is maintained in communication with the internal space of the spool valve 844. The atmosphere chamber 846 communicates with the reservoir 808 through the radial opening 841b and the annular groove 841a in the sleeve 841, the radial opening 814D in the primary piston 814, the first annular liquid chamber 827 and the radial opening 813a in the housing 813, whereby the braking liquid is introduced into the atmosphere chamber 846, and accordingly, the liquid pressure of an atmospheric pressure prevails in the atmosphere chamber 846.

At an axially central location, the outer periphery of the spool valve 844 is formed with an annular groove 844a, which continues to a radial opening 844b. In the inoperative condition shown, the annular groove 844a communicates with the inner end of the radial opening 841c in the sleeve 841. Accordingly, a communication is established between the atmosphere chamber 846 and the intensifying chamber 825 through the internal space, the radial opening 844b and the annular groove 844a of the spool valve 844, the radial opening 841c in the sleeve 841, the internal space of the larger diameter bore 814C and the radial opening 814E of the primary piston 814, and thus the liquid pressure in the intensifying chamber 825 also assumes an atmospheric pressure.

In the present embodiment, toward the rear end, the outer periphery of the spool valve 844 has a reduced diameter as compared with its axial central portion, and is formed with a radial opening 844c which provides a communication between the inside and the outside of the spool valve 844 in the region of the reduced diameter portion, while the rear end of the spool valve 844 is shaped into a conical configuration with its tip 844d being substantially semi-spherical.

As mentioned above, the input shaft 812 of the present embodiment comprises the reaction piston 816 disposed toward the outer periphery and the input plunger 817 disposed toward the axis, and the front ends of the reaction piston 816 and the input plunger 817 are disposed into the larger diameter bore 814C of the primary piston 814.

The reaction piston 816 comprises a larger diameter portion 816A which is located foremost, an intermediate diameter portion 816B which is adjacent to and rearward of the larger diameter portion and a smaller diameter portion 816C which is located further rearward of the intermediate diameter portion 816b. The internal space of the intermediate diameter portion 816B and the internal space of the smaller diameter portion 816C define an axial guide opening 816D. The rear end of the guide opening 816D is tapered so as to have an increasing diameter in the rearward direction, with its outer periphery being formed with a rearwardly facing stepped end face 816E.

On the other hand, toward the front end, the outer periphery of the input plunger 817 is provided as a smaller diameter portion 817a which matches the internal diameter of the guide opening 816D, and also includes a portion located rearward of the smaller diameter portion 817a which is provided as a larger diameter portion 817b which matches the internal diameter of the smaller diameter portion 816C of the reaction piston 816.

The smaller diameter portion 817a of the input plunger 817 extends slidably into the guide opening 816D of the reaction piston 816 from the rear side while the larger diameter portion 817b of the input plunger 817 is slidably fitted into the inner periphery of the smaller diameter portion 816C of the reaction piston 816. An annular seal member 847 is fitted in the smaller diameter portion 817a of the input plunger 817 to maintain a liquid tightness between the outer periphery of the smaller diameter portion 817a and the inner periphery of the guide opening 816D. An annular stop 848 is fitted in the outer periphery of the smaller diameter portion 817a toward the front end to define the retracting end of the input plunger 817 relative to the reaction piston 816 and also to prevent the input plunger 817 from being dislodged rearwardly from the reaction piston 816. In the inoperative condition shown, the input plunger 817 is at its retracted end where it is located rearmost with respect to the reaction piston 816, and at this time, the stepped end face 817c of the input shaft 817 is by a given distance spaced from the opposing stepped end face of the reaction piston 816. In other words, an axial relative movement is permitted between the input plunger 817 and the reaction piston 816 in an extent corresponding to the spacing between the stepped end face 817c of the input plunger 817 and the opposing stepped end face 816E of the reaction piston 816.

An annular groove is formed at the boundary between the smaller diameter portion 817a and the stepped end face 817c, and an annular rubber piece 851 is fitted therein. As the stepped end face 817c of the input plunger 817 abuts against the stepped end face 816E of the reaction piston 816, the rubber piece 851 fills in the tapered portion of the guide opening 816D at its opposing location to undergo an elastic reformation, thereby preventing the occurrence of sound of percussion as the both stepped end faces 816E and 817c abut against each other.

In the described arrangement, the input shaft 812 projects externally of the housing 813 with the smaller diameter portion 816C of the reaction piston 816 slidably extending through the smaller diameter bore 813B of the housing 813, and the rear end of the input plunger 817 which projects rearwardly through the smaller diameter bore 813B and the reaction piston 816 is connected to a brake pedal, not shown. The seal member 818 maintains a liquid tightness between the smaller diameter portion 816C of the reaction piston 816 and the smaller diameter bore 813B of the housing 813.

The larger diameter portion 816A and the intermediate diameter portion 816B of the reaction piston 816 are inserted into the larger diameter bore 814C of the primary piston 814, and then the inner periphery of the intermediate portion 816B is slidably fitted around the outer periphery of the sleeve 841 toward its rear end. The tip 844d of the spool valve 844 is disposed in abutment against the front end face of the input plunger 817.

An annular seal member 849 is fitted in the outer periphery of the sleeve 841 toward the rear end thereof to maintain a liquid tightness between the outer periphery of the sleeve 841 toward the rear end thereof and the inner periphery of the intermediate diameter portion 816B of the reaction piston.

A space 852 in the intermediate diameter portion 816B located between the rear end or end face of the sleeve 841 and the opposing stepped end face of the reaction piston 816 communicates with the atmosphere chamber 846 through the radial opening 844c and the internal space of the spool valve 844, and accordingly, the braking liquid of an atmospheric pressure is normally introduced into the space 852.

Toward the rear end, the larger diameter bore 814C of the primary piston 814 is formed with an annular groove in which an annular retainer 853 is detented, and a spring 854 of a given resilience is disposed between the retainer 853 and the larger diameter portion 816A of the reaction piston 816. In the inoperative condition shown, the reaction piston 816 is urged forward by the spring 854 relative to the primary piston 814 and the input plunger 817, and accordingly the front end face of the reaction piston 816 abuts against the opposing stepped end face of the larger diameter portion 814C. At this time, the stepped end face 816E of the reaction piston 816 is spaced from the stepped end face 817c of the input plunger 817. The larger diameter portion 816A of the reaction piston 816 is formed with a radial opening 816F, which permits a communication between the inside and the outside of the larger diameter portion 816A therethrough even under this condition.

The external diameter of the outer periphery of the sleeve 841 toward the rear end which is fitted in the intermediate diameter portion 816B of the reaction piston 816 is less than the external diameter of the smaller diameter portion 816C of the reaction piston 816, and the external diameter of the larger diameter portion 817b of the input plunger 817 is less than the external diameter of the sleeve 841 toward the rear end thereof.

The housing 813 is formed with an axial opening 813f which continues from the radial opening 813a and extends rearward. A radial opening 813g is also formed to extend radially continuing from the rear end of the axial opening 813f. An annular opening 813h continues from the radial opening 813g, and includes a rear portion which is extended radially inward to open into the larger diameter bore 813A, thus communicating with the intensifying chamber 825.

An annular groove is formed in the housing 813 in a manner crossing the axial opening 813f, and a cup seal 855 which is C-shaped in section is fitted in the annular groove. The cup seal 855 functions as a check valve which only permits a flow of braking liquid in the direction from the front side to the rear side. Accordingly, the braking liquid in the reservoir 808 is supplied into the intensifying chamber 825 through the radial opening 813a, the axial opening 813f, the cup seal 855, the radial opening 813g and the annular opening 813h. By contrast, the braking liquid in the intensifying chamber 825 can not be returned to the reservoir 808 through the path mentioned immediately above.

The housing 813 is formed with a communication opening 856 which continues from the radial opening 813g, and which communicates through a conduit 857 with a pump 858. A normally closed solenoid operated valve 859 is disposed in the conduit 857. The operation of the solenoid valve 859 and the pump 858 is controlled by a controller 839. In the present embodiment, there is provided an input sensor which detects the depression of a brake pedal, and which transmits the depression, upon detecting it, to the controller 839, which then operates the pump 858 and the solenoid valve 859, thus opening the latter.

Under the inoperative condition shown in FIG. 10, the annular groove 844a in the spool valve 844 communicates with the radial opening 841c in the sleeve 841, and accordingly, the intensifying chamber 825, the atmosphere chamber 846 and the space 852 located rearward of the sleeve 841 communicate with each other, and the braking liquid of an atmospheric pressure is introduced into these portions. If the solenoid valve 859 is opened and the pump 858 is operated under this condition, the braking liquid which is fed from the pump 858 to the intensifying chamber 825 is returned to the reservoir 808 through the atmosphere chamber 846 and no liquid pressure can be generated within the intensifying chamber 825. Thus, in the present embodiment, in the inoperative condition, a communication is established between the annular groove in the spool valve 844 and the radial opening in the sleeve 841, and a communication is also established between the atmosphere chamber 846 and the intensifying chamber 825, whereby the intensifying chamber 825 assumes an atmospheric pressure, thus forming a control valve mechanism which is generally referred to as an open-center type.

By contrast, in the operative condition as the input shaft 812 is driven forward, the spool valve 844 is driven forwardly relative to the sleeve 841, whereby the degree of opening of the radial opening 841c in the sleeve 841 which communicates with the annular groove 844a in the spool valve 844 is restricted. When the depression of a brake pedal is detected by the input sensor, the controller 839 operates the pump 858 and opens the solenoid valve 859, whereby the discharge pressure from the pump 858 is fed to the intensifying chamber 825, and thus a liquid pressure is generated in the intensifying chamber 825. The liquid pressure in the intensifying chamber 825 causes the primary piston 814 and the secondary piston 815 to advance, thus intensifying the master cylinder pressure in the first liquid pressure chamber 832 and the second liquid pressure chamber 835.

It will be appreciated from the forgoing description that the intensifying means 811 of the present embodiment comprises the input shaft 812 comprising the reaction piston 816 and the input plunger 817, the intensifying chamber 825, the control valve mechanism comprising the sleeve 841 and the spool valve 844, the atmosphere chamber 846, the pump 858 and the solenoid valve 859.

Operation

With the described arrangement, in the inoperative condition where a brake pedal is not depressed, the components of the brake system 801 assume their inoperative positions shown in FIG. 10.

Under this condition, the pump 858 is not operated, and the solenoid valve 859 remains closed. The primary piston 814 and the secondary piston 815 which are urged by the springs 822 and 823 are maintained in their rearmost retracted positions, with the rear end face of the primary piston 814 abutting against the stepped end face of the larger diameter bore 813A of the housing 813.

On the other hand, the input shaft 812 or the front end face of the reaction piston 816 abuts against the stepped end face of the bottomed opening 814A of the primary piston 814. The spool valve 844 and the input plunger 817 which are urged by the spring 845 are located at their retracted positions. The stepped end face 817c of the input plunger 817 is spaced from the stepped end face 816E of the reaction piston 816. The annular groove 844a in the spool valve 844 communicates with the radial opening 841c in the sleeve 841. Thus the intensifying chamber 825, the atmosphere chamber 846 and the space 852 rearward of the sleeve 841 communicate with each other and with the reservoir 808, the braking liquid assuming the atmospheric pressure. The first liquid pressure chamber 832 and the second liquid pressure chamber 835 of the master cylinder 803 communicate with the reservoir 808 and thus assume an atmospheric pressure.

When a brake pedal is depressed under the inoperative condition, the input plunger 817 of the input shaft 812 is initially driven to advance, and accordingly, the input sensor detects the depression of the brake pedal and transmits this to the controller 839.

The controller 839 then opens the solenoid valve 859 and operates the pump 858 simultaneously. Because a communication is established between the intensifying chamber 825 and the atmosphere chamber 846 at this time, the braking liquid fed from the pump 858 to the intensifying chamber 825 is returned to the reservoir 808 through the atmosphere chamber 846, generating no liquid pressure in the intensifying chamber 825.

In response to the advance of the input plunger 817, the degree of opening of the radial opening 841c of the sleeve 841 (or an overlap with the annular groove 844a) is restricted by the outer periphery of the spool valve 844 which is located rearward of the annular groove 844a, thus generating a liquid pressure in the intensifying chamber 825. The resulting liquid pressure in the intensifying chamber 825 causes the primary piston 814 and the secondary piston 815 to advance. Thereupon, the radial opening 814a in the primary piston 814 moves forwardly of the cup seal 826, and the radial opening 815a in the secondary piston 815 moves forwardly of the cup seal 828. Accordingly, the communication between the first liquid pressure chamber 832 and the reservoir 808 is interrupted as is the communication between the second liquid pressure chamber 835 and the reservoir 808. Thus, a master cylinder pressure is generated in the first liquid pressure chamber 832 and the second liquid pressure chamber 835.

It will be noted that the liquid pressure in the intensifying chamber 825 acts to urge the reaction piston 816 rearward by an amount corresponding to the cross-sectional area of the smaller diameter portion 816c of the reaction piston 816 which is located radially outward of the outer periphery of the sleeve 841. When the force which urges the reaction piston 816 rearward becomes equal to a given value, the spring 854 is compressed, whereby the reaction piston 816 retracts relative to the primary piston 814 and the input plunger 817 and the stepped end face 816E of the reaction piston 816 abuts against the stepped end face 817c of the input plunger 817. Thus, at this point in time, the force which urges the reaction piston 816 rearward is transmitted as a reaction to a driver through the input plunger 817 and a brake pedal, not shown.

Figure 11:
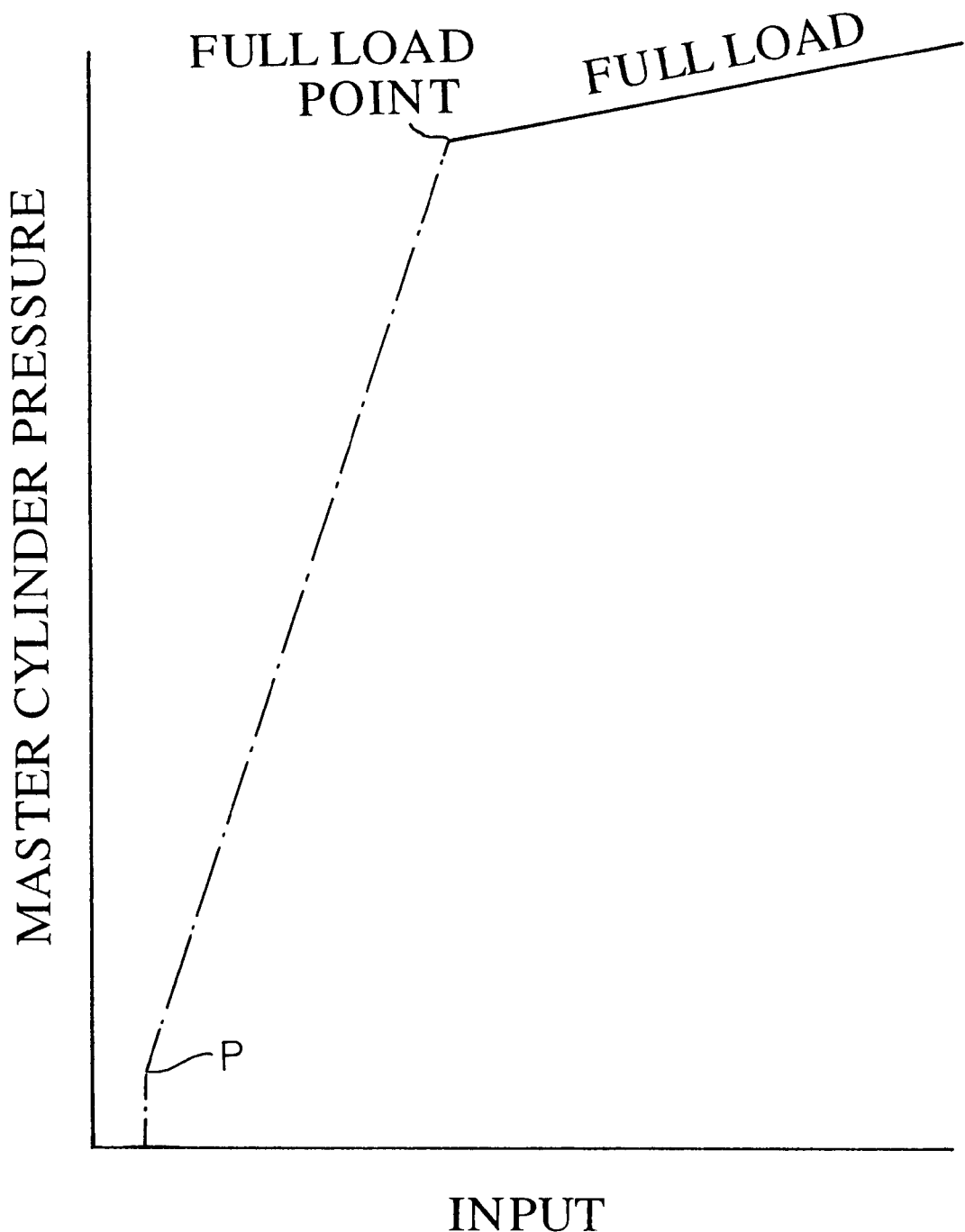
FIG. 11 is a characteristic diagram of a brake system shown in FIG. 10.

Specifically, in the present embodiment, a reaction begins to be transmitted to a driver from a point where a brake pedal is depressed to generate a master cylinder pressure to compress the spring 854 so that the stepped end face 816E of the reaction piston 816 abuts against the stepped end face 817c of the input plunger 817, as shown in FIG. 11. The point P where the reaction begins to be transmitted to the input plunger 817 corresponds to a sharp rise in the master cylinder pressure, thus allowing a so-called jumping characteristic to be obtained by the intensifying means 811.

After the master cylinder pressure is generated in this manner, the restriction of the radial opening 841c in the sleeve 841 is controlled by the spool valve 844 so that the reaction with which the liquid pressure in the intensifying chamber 825 urges the reaction piston 816 rearward is balanced with the input applied to the input shaft 812, thus allowing the master cylinder pressure to rise in proportion to the input.

Subsequently, when the brake pedal is released, the input is removed from the input shaft 812, which therefore retracts rearwardly to its inoperative position. When the controller 839 confirms the absence of the input through a signal transmitted from the input sensor, it ceases to operate the pump 858 and closes the solenoid valve 859.

On the other hand, as the input shaft 812 retracts, the spool valve 844 which is urged by the spring 845 moves rearward relative to the sleeve 841 and the primary piston 814 while its tip 844d is held in abutment against the end face of the input plunger 817.

This increases the overlap of the radial opening 841c in the sleeve 841 with respect to the annular groove 844a in the spool valve 844, thus displacing the braking liquid from the intensifying chamber 825 through the larger diameter bore 814C of the primary piston 814, the internal space of the spool valve 844 and the atmosphere chamber 846 to the reservoir 808. Thus, the primary piston 814 and the secondary piston 815 also retract rearwardly. As the intensifying chamber 825 assumes an atmospheric pressure, the front end face of the reaction piston 816 is brought into abutment against the stepped end face of the bottomed opening 814A of the primary piston 814 by the spring 854, whereupon the stepped end face 816E of the reaction piston 816 becomes spaced from the stepped end face 817c of the input plunger 817, thus returning the respective components to their inoperative positions shown in FIG. 10.

As mentioned above, in the present embodiment, the intensifying means 811 is integrally assembled into a rear part of the primary piston 814, and this allows the overall size of the brake system 801 to be reduced with a simple construction as compared with the prior art in which a brake booster and a master cylinder are separately provided.

In addition, the intensifying means 811 of the present embodiment is constructed so that a reaction resulting from the pressure in the intensifying chamber 825 which acts upon the reaction piston 816 during the intensification step is transmitted to the input plunger 817 when it exceeds the urging force of the spring 854, thus permitting the so-called the jumping characteristic to be obtained and improving the effectiveness of the brake at the commencement of the intensification.

In the present embodiment, a control valve mechanism of open center type is used in which the intensifying chamber 825, the atmosphere chamber 846 and the reservoir 808 communicate with each other in the inoperative condition, but the invention is equally applicable to a control valve mechanism of closed center type in which the communication between the intensifying chamber 825 and the reservoir 808 is interrupted in the inoperative condition. Even in this instance, the transmission of the reaction which results from the pressure in the intensifying chamber 825 during the intensification step or at the commencement of the intensification to the input shaft 812 remains the same as in the previous embodiments.

In the ninth embodiment, during the intensification step, the pressure in the intensifying chamber 825 is prevented from acting upon the input plunger 817, but the pressure in the intensifying chamber 825 may be allowed to act upon the input plunger 817.

In the ninth embodiment, the outer peripheral surface of a rear portion of the sleeve 841 is slidably fitted into the inner peripheral surface of the intermediate diameter portion 816B of the reaction piston 816 so that the degree of opening of the radial opening 814c in the sleeve 841 may be controlled to control the pressure in the intensifying chamber 825. However, rather than fitting the outer peripheral surface of the rear portion of the sleeve 841 into the inner peripheral surface of the intermediate diameter portion 816B of the reaction piston 816, the rear end of the sleeve 841 may be disposed adjacent to the intensifying chamber 825 so that the degree of opening of the radial opening 841b in the sleeve 841 may be controlled by the spool valve 844 so as to control the pressure in the intensifying chamber 825, thus allowing the pressure in the intensifying chamber 825 to act upon the rear end face of the smaller diameter portion 817a of the input plunger 817 also.

In this instance, the pressure in the intensifying chamber 825 acts upon the smaller diameter portion 817a of the input plunger 817 during the intensification step, but the reaction which results from the pressure in the intensifying chamber 825 which acts upon the reaction piston 816 can not be transmitted to the input plunger 812 at the commencement of the intensification when the pressure in the intensifying chamber 825 is low, and accordingly the intensification takes place at a greater gradient of intensification under this condition, and when the pressure in the intensifying chamber becomes greater than a given value, the reaction piston 816 retracts to abut against the input plunger 817, thus allowing the reaction which results from the pressure in the intensifying chamber 825 which acts upon the reaction piston 816 to be transmitted to the input plunger 817, thus allowing an intensification with a usual gradient of intensification.

Accordingly, the jumping characteristic can be obtained again in the similar manner as in the described embodiment.

In the embodiment, the sleeve 841 is fitted into the bottomed opening 814a of the primary piston 814, but a member which is equivalent to the sleeve 841 may be formed integrally with the bottomed opening 814a of the primary piston 814.

In addition, while the input shaft 812 of the master cylinder 803 is directly coupled to the brake pedal in the described embodiment, a brake booster may be provided separately, and an output shaft of the booster may be connected to the input shaft 812.

While the invention has been described above in connection with several embodiments thereof, it should be understood that a number of changes, modifications and substitutions therein are possible therein from the above disclosure without departing from the spirit and the scope of the invention defined by the appended claims.

What is claimed is:

1. A brake system including a reservoir of braking liquid, a master cylinder defined in a housing for generating a master cylinder pressure as an associated master cylinder piston advances through the master cylinder and a wheel cylinder which is fed with the master cylinder pressure, the brake system comprising:

intensifying means for causing the master cylinder piston to advance as required to intensify the master cylinder pressure; and the intensifying means comprising an intensifying chamber formed rearward of the master cylinder piston in the housing, a source of pressure connected to the intensifying chamber, an input shaft having a front end which is disposed adjacent to the intensifying chamber and coupled to a brake operating member to cause the master cylinder piston to advance, a cylindrical member which projects into the intensifying chamber and defines a guide opening therein, an outer periphery of the cylindrical member being slidably fitted into a bottomed opening formed in one of a rear end of the master cylinder piston and the front end of the input shaft while maintaining a liquid tightness therebetween, and a control valve mechanism disposed between the front end of the input shaft and the rear end of the master cylinder piston for switching a communication between the intensifying chamber and the reservoir;

the control valve mechanism comprising a spool valve slidably fitted into the guide opening of the cylindrical member and having one end which abuts against either the rear end of the master cylinder piston or the front end of the input shaft and allows for a radial misalignment between the axes of the master cylinder piston and the input shaft.

2. A brake system according to claim 1 wherein a front end of the cylindrical member is fitted into said one master cylinder piston and input shaft, and a rear end of the cylindrical member is slidably fitted into a bottomed opening formed in the other of the rear end of the master cylinder piston and the front end of the input shaft, and the guide opening of the cylindrical member communicates with the reservoir.

3. A brake system according to claim 1 in which the control valve mechanism is disposed to be moveable relative to the master cylinder piston, and includes stroke reducing means which controls relative positions of the control valve mechanism and the master cylinder piston so that the stroke of the input shaft is reduced as compared with the stroke of the master cylinder piston.

4. A brake system according to claim 1 in which the input shaft comprises a reaction piston having a front end which is disposed adjacent to the intensifying chamber, and an input plunger which is slidably fitted into an inner periphery of the reaction piston and has a rear end which is connected to a brake operating member, the reaction piston and the input plunger having engaging portions which are engageable when the reaction piston retracts through a given distance relative to the input plunger, and a resilient member disposed between the reaction piston and the master cylinder piston for urging the reaction piston forwardly.

5. A brake system according to claim 1 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

6. A brake system according to claim 5 wherein the cylindrical member comprises a sleeve slidably fitted into the bottomed opening which is formed in the master cylinder piston, a relative movement between the sleeve and the spool valve being effective to switch a communication between the intensifying chamber and the reservoir.

7. A brake system according to claim 5 in which a normally closed solenoid operated valve is disposed in a path for connecting a liquid pressure between the intensifying chamber and the source of pressure.

8. A brake system according to claim 5 in which a normally closed solenoid operated valve is disposed in a path for connecting a liquid pressure between the intensifying chamber and the source of pressure.

9. A brake system according to claim 1 in which the control valve mechanism establishes a communication between the intensifying chamber and the reservoir in the inoperative condition and restricts a flow of a pressure liquid from the intensifying chamber to the reservoir as a pressure from the source of pressure is fed to the intensifying chamber to drive the input shaft forward to thereby control the pressure in the intensifying chamber in accordance with an input applied to the input shaft.

10. A brake system according to claim 9 wherein the cylindrical member comprises a sleeve, an inner periphery of the sleeve defining the guide opening in which the spool valve is slidably fitted, a relative movement between the sleeve and the spool valve being effective to switch a communication between the intensifying chamber and the reservoir.

11. A brake system according to claim 1, further comprising a brake booster for actuating the master cylinder, an input applied to the input shaft being an output from the brake booster.

12. A brake system including a reservoir of braking liquid, a master cylinder defined in a housing for generating a master cylinder pressure as an associated master cylinder piston advances through the master cylinder and a wheel cylinder which is fed with the master cylinder pressure, the brake system comprising:

intensifying means for causing the master cylinder piston to advance as required to intensify the master cylinder pressure;

the intensifying means comprising an intensifying chamber formed rearward of the master cylinder piston in the housing, a source of pressure connected to the intensifying chamber, an input shaft having a front end which is disposed adjacent to the intensifying chamber and coupled to a brake operating member to cause the master cylinder piston to advance, a cylindrical sleeve having one end fitted into and secured to a bottomed opening formed in either the rear end of the master cylinder piston or the front end of the input shaft, the inner periphery of the sleeve defining a guide opening, and a control valve mechanism disposed between the front end of the input shaft and the rear end of the master cylinder piston for switching a communication between the intensifying chamber and the reservoir;

the control valve mechanism comprising a spool valve slidably fitted into the guide opening and having one end which abuts against either the rear end of the master cylinder piston or the front end of the input shaft and allows for a radial misalignment between the axes of the master cylinder piston and the input shaft.

13. A brake system according to claim 12 wherein the one end of the spool valve is substantially semi-spherical in shape.

14. A brake system according to claim 12 in which the control valve mechanism is disposed to be moveable relative to the master cylinder piston, and includes stroke reducing means which controls relative positions of the control valve mechanism and the master cylinder piston so that the stroke of the input shaft is reduced as compared with the stroke of the master cylinder piston.

15. A brake system according to claim 12 in which the input shaft comprises a reaction piston having a front end which is disposed adjacent to the intensifying chamber, and an input plunger which is slidably fitted into an inner periphery of the reaction piston and has a rear end which is connected to a brake operating member, the reaction piston and the input plunger having engaging portions which are engageable when the reaction piston retracts through a given distance relative to the input plunger, and a resilient member disposed between the reaction piston and the master cylinder piston for urging the reaction piston forwardly.

16. A brake system according to claim 12 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

17. A brake system according to claim 16 wherein the cylindrical sleeve is slidably fitted into the bottomed opening which is formed in the master cylinder piston, and a relative movement between the sleeve and the spool valve being effective to switch a communication between the intensifying chamber and the reservoir.

18. A brake system according to claim 16 in which a normally closed solenoid operated valve is disposed in a path for connecting a liquid pressure between the intensifying chamber and the source of pressure.

19. A brake system according to claim 16 in which a normally closed solenoid operated valve is disposed in a path for connecting a liquid pressure between the intensifying chamber and the source of pressure.

20. A brake system according to claim 12 in which the control valve mechanism establishes a communication between the intensifying chamber and the reservoir in the inoperative condition and restricts a flow of a pressure liquid from the intensifying chamber to the reservoir as a pressure from the source of pressure is fed to the intensifying chamber to drive the input shaft forward to thereby control the pressure in the intensifying chamber in accordance with an input applied to the input shaft.

21. A brake system according to claim 20 wherein the cylindrical sleeve is slidably fitted into the bottomed opening which is formed in the master cylinder piston, and a relative movement between the sleeve and the spool valve being effective to switch a communication between the intensifying chamber and the reservoir.

22. A brake system according to claim 12, further comprising a brake booster for actuating the master cylinder, an input applied to the input shaft being an output from the brake booster.

23. A brake system including a reservoir of braking liquid, a master cylinder defined in a housing for generating a master cylinder pressure as an associated master cylinder piston advances through the master cylinder, and a wheel cylinder which is fed with the master cylinder pressure, the brake system comprising:

intensifying means for causing the master cylinder piston to advance as required to intensify the master cylinder pressure;

the intensifying means comprising an intensifying chamber formed rearward of the master cylinder piston in the housing, a source of pressure connected to the intensifying chamber, an input shaft having a front portion which is disposed adjacent to the intensifying chamber and coupled to a brake operating member to cause the master cylinder piston to advance, and a control valve mechanism disposed between the front end of the input shaft and the rear end of the master cylinder piston for switching a communication between the intensifying chamber and the reservoir, the control valve mechanism being disposed to be movable relative to the master cylinder piston; and stroke reducing means for controlling relative positions of the control valve mechanism and the master cylinder piston so that the stroke of the input shaft is reduced as compared to the stroke of the master cylinder piston.

24. A brake system according to claim 23 in which the stroke reducing means controls the relative positions of the control valve mechanism and the master cylinder piston by hydraulic pressure.

25. A brake system according to claim 24 in which the hydraulic pressure represents a pressure in the intensifying chamber and the relative positions of the control valve mechanism and the master cylinder piston are controlled by a force acting upon the control valve mechanism which results from the pressure in the intensifying chamber and the urging force upon the control valve mechanism of a resilient member which is disposed between the control valve mechanism and the master cylinder piston.

26. A brake system according to claim 23 in which the stroke reducing means controls the relative positions of the control valve mechanism and the master cylinder piston by an urging force from a resilient member.

27. A brake system according to claim 26 in which the relative positions of the control valve mechanism and the master cylinder piston are controlled by an urging force of a second resilient member disposed between the control valve mechanism and the master cylinder piston and an urging force of a third resilient member disposed between the control valve mechanism and the housing.

28. A brake system according to claim 23 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

29. A brake system according to claim 28 in which the sleeve is cylindrical and is slidably fitted into a bottomed opening in the master cylinder piston, and a spool valve slidably fitted into the sleeve, a relative movement between the sleeve and the spool valve being effective to switch a communication between the intensifying chamber and the reservoir.

30. A brake system according to claim 28 in which a normally closed solenoid operated valve is disposed in a path for connecting a liquid pressure between the intensifying chamber and the source of pressure.

31. A brake system according to claim 23 in which the control valve mechanism establishes a communication between the intensifying chamber and the reservoir in the inoperative condition and restricts a flow of a pressure liquid from the intensifying chamber to the reservoir as a pressure from the source of pressure is fed to the intensifying chamber to drive the input shaft forward to thereby control the pressure in the intensifying chamber in accordance with an input applied to the input shaft.

32. A brake system according to claim 31 in which the sleeve is cylindrical and is slidably fitted into a bottomed opening in the master cylinder piston, and a spool valve slidably fitted into the sleeve, a relative movement between the sleeve and the spool valve being effective to switch a communication between the intensifying chamber and the reservoir.

33. A brake system according to claim 31 in which a normally closed solenoid operated valve is disposed in a path for connecting a liquid pressure between the intensifying chamber and the source of pressure.

34. A brake system including a reservoir of braking liquid, a master cylinder defined in a housing for generating a master cylinder pressure as an associated master cylinder piston advances through the master cylinder, and a wheel cylinder which is fed with the master cylinder pressure, said brake system comprising:

intensifying means for causing the master cylinder piston to advance as required to intensify the master cylinder pressure;

the intensifying means comprising an intensifying chamber formed rearward of the master cylinder piston in the housing, a source of pressure connected to the intensifying chamber, an input shaft having a front portion disposed adjacent to the intensifying chamber and coupled to a brake operating member to cause the master cylinder piston to advance, and a control valve mechanism disposed between the front end of the input shaft and the rear end of the master cylinder piston for switching a communication between the intensifying chamber and the reservoir;

the input shaft comprising a reaction piston having a front end which is disposed adjacent to the intensifying chamber, and an input plunger slidably fitted into an inner periphery of the reaction piston and having a rear end which is coupled to the brake operating member, the reaction piston and the input plunger having engaging portions which are engageable with one another when the reaction piston retracts rearwardly through a given distance relative to the input plunger, further comprising a resilient member disposed between the reaction piston and the master cylinder piston for urging the reaction piston forwardly.

35. A brake system according to claim 34 in which the pressure in the intensifying chamber which is acting upon the input shaft is limited only to the front end face of the reaction piston which is disposed adjacent to the intensifying chamber or to the front end face of the reaction piston which is disposed adjacent to the intensifying chamber and to the front end face of the input plunger.

36. A brake system according to claim 34 in which the reaction piston abuts against the master cylinder piston in the inoperative condition and retracts against the resilient member whenever a pressure in the intensifying chamber becomes equal to or greater than a given value, whereupon the engaging portions of the reaction piston and the input plunger are engaged.

37. A brake system according to claim 36 in which the control valve mechanism comprises a bottomed opening disposed rearward of the master cylinder piston, one end of a cylindrical sleeve being fitted into and secured to the bottomed opening, the inner peripheral surface of the sleeve defining a guide opening, the outer periphery of the sleeve being slidably fitted at its other end into an engaging opening formed in the front end of the reaction piston while maintaining a liquid tightness therebetween.

38. A brake system according to claim 34 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

39. A brake system according to claim 38 in which the control valve mechanism comprises a cylindrical sleeve slidably fitted into a bottomed opening in the master cylinder piston, and a spool valve slidably fitted into the sleeve, a relative movement between the sleeve and the spool valve being effective to switch a communication between the intensifying chamber and the reservoir.

40. A brake system according to claim 38 in which a normally closed solenoid operated valve is disposed in a path for connecting a liquid pressure between the intensifying chamber and the source of pressure.

41. A brake system according to claim 34 in which the control valve mechanism establishes a communication between the intensifying chamber and the reservoir in the inoperative condition and restricts a flow of a pressure liquid from the intensifying chamber to the reservoir as a pressure from the source of pressure is fed to the intensifying chamber to drive the input shaft forward to thereby control the pressure in the intensifying chamber in accordance with an input applied to the input shaft.

42. A brake system according to claim 41 in which the control valve mechanism comprises a cylindrical sleeve slidably fitted into a bottomed opening in the master cylinder piston, and a spool valve slidably fitted into the sleeve, a relative movement between the sleeve and the spool valve being effective to switch a communication between the intensifying chamber and the reservoir.

43. A brake system according to claim 41 in which a normally closed solenoid operated valve is disposed in a path for connecting a liquid pressure between the intensifying chamber and the source of pressure.

44. A brake system according to claim 23 further comprising a brake booster for actuating the master cylinder, the input applied to the input shaft being an output from the brake booster.

45. A brake system according to claim 34, further comprising a brake booster for actuating the master cylinder, the input applied to the input shaft being an output from the brake booster.

46. A brake system according to claim 34 wherein the reaction piston retracts rearwardly and causes compression of the resilient member when a pressure in the intensifying chamber becomes equal to or greater than a predetermined value, whereupon the engaging portion of the reaction piston engages the engaging portion of the input plunger and the retracting rearward movement of the reaction piston is transmitted to the brake operating member through the input plunger.

47. A brake system including a reservoir of braking liquid, a master cylinder defined in a housing for generating a master cylinder pressure as an associated master cylinder piston advances through the master cylinder, and a wheel cylinder which is fed with the master cylinder pressure, the brake system comprising:

intensifying means for causing the master cylinder piston to advance as required to intensify the master cylinder pressure;

the intensifying means comprising an intensifying chamber formed rearward of the master cylinder piston in the housing, a source of pressure connected to the intensifying chamber, an input shaft having a front portion which is disposed adjacent to the intensifying chamber and coupled to a brake operating member to cause the master cylinder piston to advance, and a control valve mechanism disposed between the front end of the input shaft and the rear end of the master cylinder piston for switching a communication between the intensifying chamber and the reservoir, the control valve mechanism being disposed to be movable relative to the master cylinder piston; and stroke reducing means for controlling relative positions of the control valve mechanism and the master cylinder piston by hydraulic pressure so that the stroke of the input shaft is reduced as compared to the stroke of the master cylinder piston.

48. A brake system according to claim 47 in which the hydraulic pressure represents a pressure in the intensifying chamber and the relative positions of the control valve mechanism and the master cylinder piston are controlled by a force acting upon the control valve mechanism which results from the pressure in the intensifying chamber and the urging force upon the control valve mechanism of the resilient member which is disposed between the control valve mechanism and the master cylinder piston.

49. A brake system according to claim 47, further comprising a brake booster for actuating the master cylinder, the input applied to the input shaft being an output from the brake booster.

50. A brake system according to claim 47 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

51. A brake system according to claim 50 in which a normally closed solenoid operated valve is disposed in a path for connecting a liquid pressure between the intensifying chamber and the source of pressure.

52. A brake system according to claim 50 in which the control valve mechanism comprises a cylindrical sleeve slidably fitted into a bottomed opening in the master cylinder piston, and a spool valve slidably fitted into the sleeve, a relative movement between the sleeve and the spool valve being effective to switch a communication between the intensifying chamber and the reservoir.

53. A brake system including a reservoir of braking liquid, a master cylinder defined in a housing for generating a master cylinder pressure as an associated master cylinder piston advances through the master cylinder, and a wheel cylinder which is fed with the master cylinder pressure, the brake system comprising:

intensifying means for causing the master cylinder piston to advance as required to intensify the master cylinder pressure;

the intensifying means comprising an intensifying chamber formed rearward of the master cylinder piston in the housing, a source of pressure connected to the intensifying chamber, an input shaft having a front portion which is disposed adjacent to the intensifying chamber and coupled to a brake operating member to cause the master cylinder piston to advance, and a control valve mechanism disposed between the front end of the input shaft and the rear end of the master cylinder piston for switching a communication between the intensifying chamber and the reservoir, the control valve mechanism being disposed to be movable relative to the master cylinder piston; and stroke reducing means for controlling relative positions of the control valve mechanism and the master cylinder piston by an urging force from a resilient member so that the stroke of the input shaft is reduced as compared to the stroke of the master cylinder piston.

54. A brake system according to claim 53, further comprising a brake booster for actuating the master cylinder, the input applied to the input shaft being an output from the brake booster.

55. A brake system according to claim 53 in which the relative positions of the control valve mechanism and the master cylinder piston are controlled by an urging force of a second resilient member disposed between the control valve mechanism and the master cylinder piston and an urging force of a third resilient member disposed between the control valve mechanism and the housing.

56. A brake system according to claim 53 in which the control valve mechanism interrupts a communication between the intensifying chamber and the reservoir in the inoperative condition, and establishes a communication between the intensifying chamber and the reservoir as a pressure from the source of pressure is fed to the intensifying chamber while restricting a flow of a pressure liquid from the intensifying chamber to the reservoir to control the pressure in the intensifying chamber in accordance with an input applied to the input shaft.

57. A brake system according to claim 56 in which a normally closed solenoid operated valve is disposed in a path for connecting a liquid pressure between the intensifying chamber and the source of pressure.

58. A brake system according to claim 56 in which the control valve mechanism comprises a cylindrical sleeve slidably fitted into a bottomed opening in the master cylinder piston, and a spool valve slidably fitted into the sleeve, a relative movement between the sleeve and the spool valve being effective to switch a communication between the intensifying chamber and the reservoir.

* * * * *